US010158394B2

(12) United States Patent
Hadani et al.

(10) Patent No.: US 10,158,394 B2
(45) Date of Patent: Dec. 18, 2018

(54) SYSTEMS AND METHODS FOR SYMPLECTIC ORTHOGONAL TIME FREQUENCY SHIFTING MODULATION AND TRANSMISSION OF DATA

(71) Applicant: Cohere Technologies, Santa Clara, CA (US)

(72) Inventors: Ronny Hadani, Santa Clara, CA (US); Shlomo Selim Rakib, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/573,793

(22) PCT Filed: May 11, 2016

(86) PCT No.: PCT/US2016/031909
§ 371 (c)(1),
(2) Date: Nov. 13, 2017

(87) PCT Pub. No.: WO2016/183230
PCT Pub. Date: Nov. 17, 2016

(65) Prior Publication Data
US 2018/0109284 A1     Apr. 19, 2018

Related U.S. Application Data

(60) Provisional application No. 62/159,853, filed on May 11, 2015, provisional application No. 62/160,257, (Continued)

(51) Int. Cl.
*H04B 1/692*     (2011.01)
*H04L 1/00*      (2006.01)
(Continued)

(52) U.S. Cl.
CPC .......... *H04B 1/692* (2013.01); *H04L 1/0071* (2013.01); *H04L 5/0021* (2013.01);
(Continued)

(58) Field of Classification Search
CPC .. H04B 1/692; H04L 27/2627; H04L 27/2649
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

International Search Report and Written Opinion for International Application No. PCT/US2017/025797, dated Jun. 21,2017, 6 pages.
(Continued)

*Primary Examiner* — Jaison Joseph
(74) *Attorney, Agent, or Firm* — Perkins Coie LLP

(57) ABSTRACT

An alternative method of data communications using orthogonal time frequency shifting (OTFS) wireless waveforms configured so as to transmit data in a manner that is relatively insensitive to communications channel distortions and frequency shifts. In contrast to prior methods taught by applicant, the present disclosure teaches an alternative modulation scheme that maps data symbols intended for data transmission onto a symplectic-like 2D Fourier transform which operates on a form of the original data symbols. This 2D Fourier transform in turn is passed through a filter bank of narrow band filters, and the output in turn used to modulate transmitted waveforms according to various time
(Continued)

slices until the entire 2D Fourier transform has been transmitted. At the receiver, and inverse of this process can be used to both characterize the data channel and correct the received signals for channel distortions, thus receiving a clear form of the original data symbols.

18 Claims, 21 Drawing Sheets

Related U.S. Application Data filed on May 12, 2015, provisional application No. 62/173,801, filed on Jun. 10, 2015, provisional application No. 62/182,372, filed on Jun. 19, 2015, provisional application No. 62/182,760, filed on Jun. 22, 2015, provisional application No. 62/185,617, filed on Jun. 27, 2015, provisional application No. 62/185,643, filed on Jun. 28, 2015.

(51) Int. Cl.
*H04L 5/00* (2006.01)
*H04L 27/26* (2006.01)
(52) U.S. Cl.
CPC ........ *H04L 27/264* (2013.01); *H04L 27/2627* (2013.01); *H04L 27/2649* (2013.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Plan et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0129495 A1 | 5/2009 | Jin et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |

(56) References Cited

U.S. PATENT DOCUMENTS

| | | |
|---|---|---|
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169409 A1 | 6/2014 | Ma et al. |
| 2014/0169433 A1 | 6/2014 | Hadani et al. |
| 2014/0169436 A1 | 6/2014 | Hadani et al. |
| 2014/0169437 A1* | 6/2014 | Hadani ............... H04L 5/0044 375/232 |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0348271 A1 | 11/2014 | Ma et al. |
| 2014/0364128 A1 | 12/2014 | Lee et al. |
| 2012/0150036 A1 | 2/2015 | Ishikawa |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1* | 5/2017 | Rakib ............... H04L 27/2627 |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

International Search Report and Written Opinion for International Application No. PCT/US2016/030259, dated Aug. 4, 2016, 13 pages.

Office Action for U.S. Appl. No. 15/152,464, dated Apr. 6, 2017, 10 pages.

Examination Report No. 1 for Australian Application No. 2013280487, dated May 2, 2016, 3 pages.

International Search Report and Written Opinion for International Application No. PCT/US2016/031928, dated Oct. 7, 2016, 10 pages.

Office Action for U.S. Appl. No. 15/188,946, dated May 8, 2017, 14 pages.

International Search Report and Written Opinion for International Application No. PCT/US2016/038584, dated Sep. 26, 2016, 8 pages.

Office Action for U.S. Appl. No. 15/187,668, dated Feb. 16, 2017, 6 pages.

International Search Report and Written Opinion for International Application No. PCT/US2016/031909, dated Aug. 11, 2016, 13 pages.

Office Action for U.S. Appl. No. 15/194,494, dated May 5, 2017, 16 pages.

International Search Report and Written Opinion for International Application No. PCT/US2016/039662, dated Nov. 29, 2016, 14 pages.

Office Action for U.S. Appl. No. 15/436,653, dated Jun. 2, 2017, 10 pages.

Office Action for U.S. Appl. No. 15/208,545, dated Aug. 21, 2017, 15 pages.

International Search Report and Written Opinion for International Application No. PCT/US2016/041940, dated Oct. 20, 2016, 8 pages.

Supplementary European Search Report for European Application No. 13768150.8, dated Oct. 30, 2015, 7 pages.

International Search Report and Written Opinion for International Application No. PCT/US2013/033652, dated Jun. 12, 2013, 8 pages.

International Search Report and Written Opinion for International Application No. PCT/US2015/041417, dated Oct. 1, 2015, 7 pages.

Office Action for U.S. Appl. No. 14/805,407, dated Dec. 14, 2016, 7 pages.

International Search Report and Written Opinion for International Application No. PCT/US2015/041420, dated Oct. 1, 2015, 6 pages.

International Search Report and Written Opinion for PCT Application No. PCT/US2016/062590, dated Feb. 6, 2017, 11 pages.

International Search Report and Written Opinion for PCT Application No. PCT/US2016/031909, dated Aug. 11, 2016, 13 pages.

International Search Report and Written Opinion for PCT Application No. PCT/US2016/041894, dated Sep. 27, 2016, 10 pages.

Office Action for U.S. Appl. No. 13/117,119, dated Aug. 5, 2013, 5 pages.

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

(56) References Cited

OTHER PUBLICATIONS

Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network_html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.

* cited by examiner

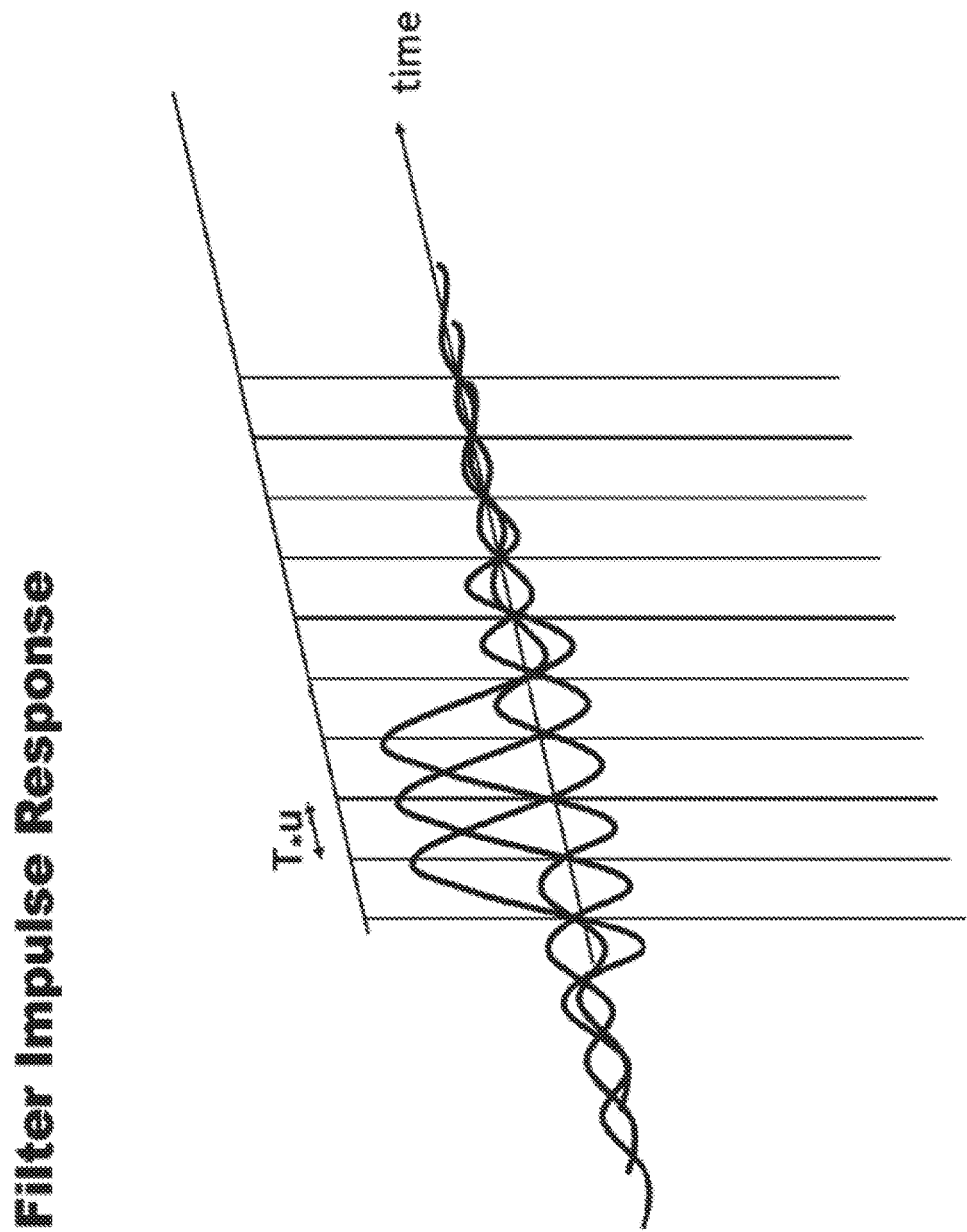

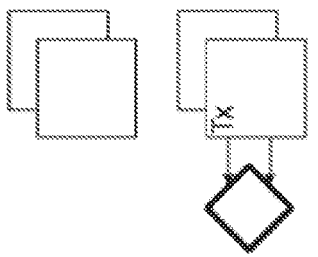
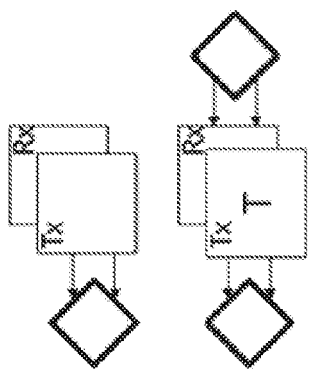
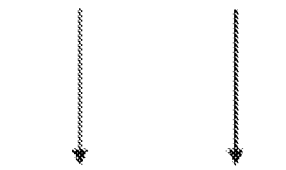
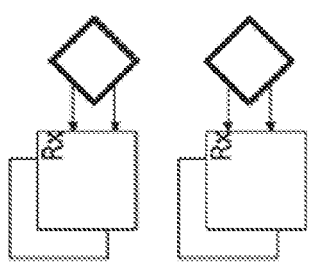
FIG. 19

SYSTEMS AND METHODS FOR SYMPLECTIC ORTHOGONAL TIME FREQUENCY SHIFTING MODULATION AND TRANSMISSION OF DATA

CROSS REFERENCE TO RELATED APPLICATIONS

This application is a 35 U.S.C. § 371 National Stage application of International Application No. PCT/US2016/031909, filed on May 11, 2016, which claims the benefit of priority of U.S. Provisional Patent Application No. 62/159,853, filed on May 11, 2015, U.S. Provisional Patent Application No. 62/160,257, filed on May 12, 2015, U.S. Provisional Patent Application No. 62/173,801, filed on Jun. 10, 2015, U.S. Provisional Patent Application No. 62/182,372, filed on Jun. 19, 2015, U.S. Provisional Patent Application No. 62/182,760, filed on Jun. 22, 2015, U.S. Provisional Patent Application No. 62/185,617, filed on Jun. 27, 2015 and U.S. Provisional Patent Application No. 62/185,643, filed on Jun. 28, 2015. The entire contents of all of these applications are incorporated herein by reference.

TECHNICAL FIELD

This patent document relates to the field of telecommunications, in particular in methods to estimate and compensate for impairments in telecommunications data channels.

BACKGROUND

Ever since the advent of the first transatlantic cable back in back in 1858, which to the disappointment of its backers, was only capable of transmitting data at a rate of about 100 words every 16 hours, the impact of imperfect data channels on communications speed and reliability has been apparent to the telecommunications industry.

Making a quick transition to modern times, even modern day electronic wires (e.g. CATV cable), optical fibers, and wireless (radio) methods of data transmission suffer from the effects of imperfect data channels. The data channels are often imperfect because they often contain various signal reflectors that are positioned at various physical locations in the media (e.g. various junctions in a 1D electrical conductor such as wires, or 1D junctions in optical conductors such as optical fiber. For wireless communications, where the media is 3D space, these reflectors can be radio reflectors that are positioned at various locations in space).

Regardless of media type and reflector type, reflectors typically distort signal waveforms by creating various echo reflections, frequency shifts, and the like. The net result is that what was originally a clear and easy to interpret signal waveform, sent by a data channel transmitter will, by the time it reaches the receiver, can be degraded by the presence of various echoes and frequency shifted versions of an original signal waveform.

Traditionally, the telecommunications industry has tended to cope with to such problems by using statistical models of these various data channel reflectors and other impairments to create a statistical profile of how the state of a given data channel (channel state) may fluctuate on a statistical basis. Such prior art includes the work of Clarke and Jakes (R. H. Clarke, *A statistical theory of mobile-radio reception*, Bell Syst. Tech. J., 47, 957-1000 (1968); and W. C. Jakes (ed.), *Microwave Mobile Communications*, Wiley, New York, 1974)) and indeed such methods are often referred to in the industry as Clarke-Jakes models.

These prior art models were useful because they helped communications engineers conservatively design equipment that would generally be robust enough for various commercial applications. For example, if the statistical model predicted that waveforms too close together in frequency would tend to be smeared onto each other by channel state with some statistical probability, then the communications specifications could be designed with enough frequency separation between channels to function to some level of statistical probability. Similarly if the statistical model showed that certain statistical fluctuations in channel states would produce corresponding fluctuations in signal intensity, then the power of the transmitted waveforms, or the maximum rate of data transmission, or both could be designed to cope with these statistical fluctuations.

A good review of these various issues is provided by Pahlavan and Levesque, *"Wireless Information Networks, Second Edition"*, 2005, John Wiley & Sons, Inc., Hoboken N.J. This book provides a good prior art review discussing how wireless radio signals are subject to various effects including multi-path fading, signal-drop off with distance, Doppler shifts, and scattering off of various reflectors.

As a specific example of prior art, consider the challenge of designing equipment for mobile cellular phones (cell phones). When a moving cell phone receives a transmission from non-moving cell phone tower (base station), although some wireless energy from the cell phone tower may travel directly to the cell phone, much of the wireless energy from the cell phone tower transmission will typically reflect off of various reflectors (e.g. the flat side of buildings), and these "replicas" of the original cell phone tower transmission will also be received by the cell phone, subject to various time delays and power loss due to the distance between the cell phone tower, the reflector, and the cell phone.

If the cell phone is moving, the reflected "replica" of the original signal will also be Doppler shifted to a varying extent. These Doppler shifts will vary according to the relative velocity and angle between the cell phone tower, the cell phone, and the location of the various buildings (reflectors) that are reflecting the signal.

According to prior art such as the Clarke-Jakes models, statistical assumptions can be made regarding average distributions of the transmitters, receivers, and various reflectors. This statistical model can then, for example be used to help set system parameters and safety margins so that, to a certain level of reliability, the system still function in spite of these effects. Thus prior art allowed reasonably robust and commercially useful systems to be produced.

Review of OTFS Methods

Wireless communications operate by modulating signals and sending these wireless (e.g. radio) signals over their respective wireless medium or "data channel" (e.g. empty air space containing various reflectors). This wireless data channel thus consists of the physical medium of space (and any objects in this space) comprising three dimensions of space and one dimension of time. In the most commonly used commercial setting of ground based wireless applications, often the third spatial dimension of height can be less important, and thus ground based wireless applications can often be adequately approximated as a two dimensional medium of space (with objects) with one dimension of time.

As previously discussed, as wireless signals travel through their space "data channel", the various signals (e.g. waveforms), which travel at the speed of light, are generally subject to various types of degradation or channel impairments. These echo signals can also potentially be generated when wireless signals bounce off of wireless reflecting surfaces, such as the sides of buildings, and other structures. For wireless signals, signals transmitted to or from a moving reflector, or to or from a moving vehicle are subject to Doppler shifts that also result in frequency shifts.

As previously discussed, these echo effects and frequency shifts are unwanted, and if such shifts become too large, can result in lower rates of signal transmission, as well as higher error rates. Thus methods to reduce such echo effects and frequency shifts are of high utility in the communications field.

In previous work, exemplified by applicant's US patent applications U.S. 61/349,619, U.S. Ser. Nos. 13/430,690, and 13/927,091, 14/583,911, as well as U.S. Pat. Nos. 8,547,988 and 8,879,378, applicant taught a novel method of wireless signal modulation that operated by spreading data symbols over a larger range of times, frequencies, and spectral shapes (waveforms) than was previously employed by prior art methods (e.g. greater than such prior art methods as Time Division Multiple Access (TDMA), Global System for Mobile Communications (GSM), Code Division Multiple Access (CDMA), Frequency Division Multiple Access (FDMA), Orthogonal Frequency-Division Multiplexing (OFDM), or other methods).

Applicant's methods, previously termed "Orthonormal Time-Frequency Shifting and Spectral Shaping (OTFSSS)" in U.S. Ser. No. 13/117,119 (and subsequently referred to by the simpler "OTFS" abbreviation in later patent applications such as U.S. Ser. No. 13/430,690) operated by sending data in larger "chunks" or frames than previous methods. That is, while a prior art CDMA or OFDM method might encode and send units or frames of "N" symbols over a communications link (e.g. data channel) over a set interval of time, applicant's OTFS methods might, for example, be based on a minimum unit or frame of N2 symbols, and often transmit these N2 symbols over longer periods of time.

In some OTFS modulation embodiments, each data symbol or element that is transmitted was also spread out to a much greater extent in time, frequency, and spectral shape space than was the case for prior art methods. As a result, at the receiver end, it often took longer to start to resolve the value of any given data symbol because this symbol had to be gradually built-up or accumulated as the full frame of N2 symbols (for example) is received.

Thus inventors' prior work related to a wireless communication method that used a combination of time, frequency and spectral shaping to transmit data in convolution unit matrices (data frames) of N·N ($N^2$) (e.g. N×N, N times N) symbols. In some embodiments, either all $N^2$ data symbols are received over N spreading time intervals (e.g. N wireless waveform bursts), or none were (e.g. receiving N bursts was required in order to reconstruct the original data bits). In other embodiments this requirement was relaxed.

To determine the times, waveforms, and data symbol distribution for the transmission process, the $N^2$ sized data frame matrix could, for example, be multiplied by a first N·N time-frequency shifting matrix, permuted, and then multiplied by a second N·N spectral shaping matrix, thereby mixing each data symbol across the entire resulting N·N matrix. This resulting data matrix was then selected, modulated, and transmitted, on a one element per time slice basis, as a series of N OTFS symbol waveform bursts. At the receiver, the replica matrix was reconstructed and deconvoluted, revealing a copy of the originally transmitted data.

For example, in some embodiments taught by U.S. patent application Ser. No. 13/117,119, the OTFS waveforms could be transmitted and received on one frame of data ([D]) at a time basis over a communications link, typically using processor and software driven wireless transmitters and receivers. Thus, for example, all of the following steps were usually done automatically using at least one processor.

This first approach used frames of data that would typically comprise a matrix of up to $N^2$ data elements, N being greater than 1. This method was based on creating an orthonormal matrix set comprising a first N×N matrix ([U1]) and a second N×N matrix ([U2]). The communications link and orthonormal matrix set were typically chosen to be capable of transmitting at least N elements from a matrix product of the first N×N matrix ([U1]), a frame of data ([D]), and the second N×N matrix ([U2]) over one time spreading interval (e.g. one burst). Here each time spreading interval could consist of at least N time slices. The method typically operated by forming a first matrix product of the first N×N matrix ([U1]), and the frame of data ([D]), and then permuting the first matrix product by an invertible permutation operation P, resulting in a permuted first matrix product P([U1][D]). The method then formed a second matrix product of this permuted first matrix product P([U1][D]) and the second N×N matrix ([U2]) forming a convoluted data matrix, according to the method, this convoluted data matrix could be transmitted and received over the wireless communications link.

On the transmitter side, for each single time-spreading interval (e.g. burst time), the method operated by selecting N different elements of the convoluted data matrix, and over different time slices in this time spreading interval, the method used a processor and typically software controlled radio transmitters to select one element from the N different elements of the convoluted data matrix, modulate this element, and wirelessly transmit this element so that each element occupied its own time slice.

On the receiver side, the receiver (typically a processor controlled software receiver) would receive these N different elements of the convoluted data matrix over different time slices in the various time spreading intervals (burst times), and demodulate the N different elements of this convoluted data matrix. These steps would be repeated up to a total of N times, thereby reassembling a replica of the convoluted data matrix at the receiver.

The receiver would then use the first N×N matrix ([U1]) and the second N×N matrix ([U2]) to reconstruct the original frame of data ([D]) from the convoluted data matrix. In some embodiments of this method, an arbitrary data element of an arbitrary frame of data ([D]) could not be guaranteed to be reconstructed with full accuracy until the convoluted data matrix had been completely recovered. In practice, the system could also be configured with some redundancy so that it could cope with the loss of at least a few elements from the convoluted data matrix.

U.S. patent application Ser. No. 13/117,119 and its provisional application 61/359,619 also disclosed some embodiments for an alternative approach of transmitting and receiving at least one frame of data ([D]) over a wireless communications link, where again this frame of data generally comprised a matrix of up to $N^2$ data elements (N being greater than 1). This alternative method worked by convoluting the data elements of the frame of data ([D]) so that the value of each data element, when transmitted, would be spread over a plurality of wireless waveforms, where each individual waveform in this plurality of wireless waveforms would have a characteristic frequency, and each individual waveform in this plurality of wireless waveforms would carry the convoluted results from a plurality of these data elements from the data frame. According to the method, the transmitter automatically transmitted the convoluted results by cyclically shifting the frequency of this plurality of wireless waveforms over a plurality of time intervals so that the value of each data element would be transmitted as a plurality of cyclically frequency shifted wireless waveforms sent over a plurality of time intervals, again as a series of waveform bursts. At the receiver side, a receiver would receive and use a processor to deconvolute this plurality of cyclically frequency shifted wireless waveforms bursts sent over a plurality of times, and thus reconstruct a replica of at least one originally transmitted frame of data ([D]). Here again, in some embodiments, the convolution and deconvolution schemes could be selected so such that an arbitrary data element of an arbitrary frame of data ([D]) could not be guaranteed to be reconstructed with full accuracy until substantially all of the plurality of cyclically frequency shifted wireless waveforms had been transmitted and received as a plurality of waveform bursts. In practice, as before, system could also be configured with some redundancy so that it could cope with the loss of at least a few cyclically frequency shifted wireless waveforms.

U.S. patent application Ser. No. 13/430,690 disclosed some embodiments of OTFS methods of transferring a plurality of data symbols using a signal modulated to allow automatic compensation for the signal impairment effects of echo reflections and frequency offsets. This method comprised distributing the plurality of data symbols into one or more N×N symbol matrices, and then using these one or more N×N symbol matrices to control the signal modulation of a transmitter. Here the scheme was that for each N×N symbol matrix, the transmitter would use each data symbol to weight N waveforms, where these waveforms were selected from a N2 sized set of all permutations of N cyclically time shifted and N cyclically frequency shifted waveforms determined according to an encoding matrix U. This process thus produced N symbol-weighted cyclically time shifted and cyclically frequency shifted waveforms for each data symbol. The encoding matrix U was chosen to be an N×N unitary matrix that has a corresponding inverse decoding matrix UH. Thus for each data symbol in the N×N symbol matrix, the OTFS system and method operated by summing the N symbol-weighted cyclically time shifted and cyclically frequency shifted waveforms, producing N2 summation-symbol-weighted cyclically time shifted and cyclically frequency shifted waveforms. The OTFS transmitter then transmitted these N2 summation-symbol-weighted cyclically time shifted and cyclically frequency shifted waveforms, structured as N composite waveforms, over any combination of N time blocks or frequency blocks.

U.S. patent application Ser. No. 13/927,088 disclosed some embodiments of OTFS methods that provided a modulated signal useable in a signal transmission system. This version of the OTFS method comprised establishing an original data frame having a first dimension of at least N elements and a second dimension of at least N elements, wherein N is greater than one. This original data frame is then transformed in accordance with a time-frequency transformation so as to provide a transformed data matrix. Here the time-frequency transformation is performed using a time-frequency shifting matrix wherein the time-frequency shifting matrix is of a first dimension having N elements and of a second dimension having N elements, where N is greater than one. The OTFS transmitter then generates the modulated signal in accordance with elements of the transformed data matrix.

U.S. patent application Ser. No. 13/927,086 disclosed some embodiments of OTFS methods that provided a method of data modulation, comprising arranging a set of data elements into an original data frame having a first dimension of N elements and a second dimension of N elements, where N is greater than one, and then transforming the original data frame in accordance with a time-frequency shifting matrix so as to form an intermediate data matrix having at least N2 elements. The method also operates by providing a transformed data matrix by permuting at least a portion of the elements of the intermediate data matrix; and generating a modulated signal based upon elements of the transformed data matrix. Here this generation process includes selecting the elements of the transformed data matrix on a column by column basis at different times, wherein the transformed data matrix includes at least N columns and at least N rows.

U.S. application Ser. No. 13/927,086 also taught OTFS methods that provided a method of receiving data comprising: receiving data signals corresponding to a transmitted data frame comprised of a set of data elements, and then constructing, based upon the data signals, a received data frame having a first dimension of at least N elements and a second dimension of at least N elements, where N is greater than one. This method then operated by inverse permuting at least a portion of the elements of the received data frame so as to form a non-permuted data frame. This in turn was then inverse transformed in accordance with a first inverse-transformation matrix so as to form a recovered data frame corresponding to a reconstructed version of the transmitted data frame. This receiving method thus determined an existence of signal distortion within the received data signals, where the signal distortion was indicative of a channel distortion relating to at least one of a frequency shift and a time shift.

In other embodiments, the methods previously disclosed in U.S. patent application Ser. Nos. 13/927,091; 13/927,086; 13/927,095; 13/927,089; 13/927,092; 13/927,087; 13/927,088; 13/927,091; 14/583,911; and/or provisional applications 62/129,930, 61/664,020, and 62/027,231 may be used for some of the OTFS modulation methods disclosed herein. The entire contents of U.S. patent applications 62/027,231, 62/129,930, Ser. Nos. 13/927,091; 13/927,086; 13/927,095; 13/927,089; 13/927,092; 13/927,087; 13/927,088; 13/927, 091; 14/583,911 and 61/664,020 are incorporated herein in their entirety.

SUMMARY

Techniques, systems, and devices are disclosed for implementing a ***.

The subject matter described in this patent document can be implemented in specific ways that provide one or more of the following features. For example, ***.

The technology described herein is based on the concept that the previous OTFS work, cited above, may be further generalized and/or at least implemented according to different schemes.

To further generalize the OTFS concept, OTFS methods may be viewed as methods that mitigate the impact of channel distortions (for wireless channels, these can be particular time shifts caused by echo reflections, and Doppler frequency shifts caused by moving objects) by distributing transmitted data symbols over a 2 dimensional time-frequency grid comprising a plurality of different time shifted and frequency shifted transmitted waveforms.

This scheme may be subject to additional constraints, such as that these different waveforms should transmit data both in an efficient manner (ideally by distributing any given data symbol over all combinations of time and frequency shifted waveforms), and in a manner that allows the receiver to correct for the channel distortions, and then reconstruct the original data.

To do this, in some embodiments, the transmitter may transmit the waveforms modulated or encoded according to a scheme that allows the receiver to determine the original time and frequency shift of any given received waveform, even after the impaired channel may have then further shifted the time and frequency of that waveform to an unexpected time and frequency location.

Thus, in a more general form of the OTFS concept, OTFS methods may be viewed as automated methods of wirelessly transmitting and receiving data over an impaired data channel connecting at least one wireless transmitter and at least one wireless receiver. Here the data can be viewed as comprising a plurality of data symbols. In transit, the impaired data channel impairs these waveforms in a manner that is at least partially describable according to a 2D channel state of the channel. Thus the transmitted wireless waveforms produce channel-convoluted waveforms the at least one wireless receiver, as previously described in some detail in parent application Ser. No. 14/583,911, the entire contents of which are incorporated herein by reference.

Thus in this more general form of the OTFS concept, the method uses at least one transmitter processor to package this data into at least one N×M (N times N, N×M) 2D array of data symbols, and the method then uses an encoding process to transmit this array of data symbols so that every data symbol is spread over a time and frequency range of wireless signals that is configured to capture a 2D channel state of this impaired data channel. The receiver processor then receives these wireless signals, and by using both the 2D channel state information to correct these signals for the data channel impairments, by using an inverse of the encoding process to decode and extract the plurality of data symbols, data is then transmitted from the transmitter to receiver.

Although the previously described methods describe various specific methods that are consistent with the above objectives. These previous methods were to some extent influenced by linear algebra considerations. The present technology is based, in part, on the insight that there are other methods to also accomplish the above objectives. In particular, the presently disclosed technology views the problem more from the perspective of calculus and Symplectic geometry.

The presently disclosed technology is inspired, in part, by the insight that when wireless signals propagate through a real world space, channel distortions, such as time delays caused by reflectors and frequency shifts caused by various Doppler velocity effects vary in essentially a continual manner. Consider what happens then, when the previously discussed OTFS methods originally transmit OTFS waveform bursts according to a relatively coarse time and frequency grid distribution. In order to adequately detect the impact of these channel distortions, the receiver should ideally detect the various signal bursts using a much finer grid or bin pattern than what may have been used to originally transmit the OTFS signal.

But what sort of 2D grid or bin pattern is optimal for the transmitter, and what sort of 2D grid or bin pattern is optimal for the receiver? Although such settings can be determined experimentally, it is desirable to also have some theoretical underpinning for these techniques, and this theoretical underpinning is disclosed herein.

Some embodiments of the disclosed technology are also based, in part, on the insight that although in some previous embodiments, the data to be transmitted and then later subsequently received may be distributed in the form of various discrete data symbols over a 2D matrix, according to some embodiments, data may be encoded and decoded using alternative methods. For example, in some embodiments, data symbols intended for transmission may optionally be first encoded (usually using an electronic processor such as a microprocessor, digital signal processor, or other electronic circuitry) into the characteristics of a manifold that is compatible with various symplectic-like 2 dimensional (2D) Fourier transforms. These symplectic-like 2D Fourier transforms can be any of symplectic Fourier transforms, discrete symplectic Fourier transforms, finite symplectic Fourier transforms, and digital or numeric approximations to the above Fourier transforms, intended to be implemented by digital circuitry by microprocessors, digital signal processors, and the like.

Depending on the type of symplectic 2D Fourier transform used, the data symbols may be first encoded by various types of methods into various types of formats or manifolds. In some situations, little or no encoding will be needed. In other situations, the data symbols may be encoded into various types of differentiable (e.g. smooth) manifolds (such as a continually varying surface), according to the teachings of Symplectic geometry. These data formats, ranging from simply N×M packaged data symbols to differentiable manifolds, can then be analyzed, transformed, and wirelessly transmitted over the communications channel according to the methods to be described herein. The receiver receives the various wireless waveforms, and processes them (according to methods to be described herein) into another format, such as a differentiable manifold. After that, the receiver can then automatically extract the received data symbols from the characteristics of the received format or differentiable manifold.

Why do this? Why, in some embodiments, would the data symbols ever be repackaged into the form of differentiable manifold? This is because a differentiable manifold is a type of manifold that has enough local similarity that it can be treated using calculus methods, and in particular symplectic methods. This in turn allows for a better theoretical analysis of the situation.

Although the results from these analytical methods will then often be implemented using digital technology and numerical methods, viewing the problem and results from a symplectic geometry perspective can be highly useful.

To help better understand the more formal mathematical analysis of the OTFS methods, the following mechanical analogy may be useful. As a simplistic mechanical example, instead of the earlier 2D matrix of discrete data symbols discussed previously, consider the case where each data symbol has a different height (mechanically, visualize the various data symbols being encoded into a series of rods of different height, each rod placed according to the symbols coordinates in the matrix). A rubber membrane is stretched over this 2D matrix (2D grid of rods of different height). This rubber membrane has a smooth surface, and thus is very simple form of a differentiable manifold that is also easy to visualize. The membrane will properly encode the height of the various rods, and thus represent the various data symbols for signal transmission purposes. The transmitter can then analyze the shape of this surface (and now we can use a wider variety of symplectic calculus methods), turn this surface into a corresponding 2D grid of OTFS wireless waveforms (typically a coarse 2D time and frequency grid), and transmit, preferably according to a scheme that allows the original 2D grid location of any given received waveform to be determined by the receiver.

Of course in the actual system, the process of transforming the underlying data symbols to an alternative form or manifold which can then be further processed using various symplectic like methods will be done mathematically, often using a computer processor or digital signal processor.

The receiver in turn can receive the channel distorted version of this transmitted 2D OTFS grid. To adequately detect various channel distortions, however, the receiver should receive OTFS wireless waveforms over a significantly finer 2D time and frequency grid. If the original data was encoded onto a differentiable manifold, then after appropriate correction for channel distortions, the resulting received surface (in our simple mechanical analogy) will look much like the same rubber membrane originally sent by the transmitter. The receiver processor can then (in our simple mechanical example) measure the various heights of the rubber membrane and in turn determine what data symbols were originally sent. If the original data was not encoded into a differentiable manifold, then of course alternative methods can be used to extract the original data symbols.

Here Symplectic geometry and methods are useful because, among other advantages, these methods allows us to better consider, from a mathematical perspective, situations where the time-frequency grid size of the transmitter does not correspond to the time-frequency grid size of the receiver. Additionally, as will be discussed, this approach also suggests alternative methods for transmitting and receiving the data symbols as well.

Some embodiments are also based, in part on the insight that alternative modulation schemes may be used to distribute data symbols into the 2 dimensional time-frequency grid comprising a plurality of different time shifted and frequency shifted transmitted waveforms. These alternative modulation schemes are still subject to the key original OTFS constraints, such as that these different waveforms should transmit data both in an efficient manner (ideally by distributing any given data symbol over all combinations of time and frequency shifted waveforms), and in a manner that allows the receiver to correct for the channel distortions, and then reconstruct the original data. However as will be seen, the details by which this is accomplished are substantially different.

BRIEF DESCRIPTION OF THE DRAWINGS

FIG. 1B also shows how direct OTFS pilot bursts (e.g. bursts traveling directly from the transmitter to the receiver without any reflections) are received at the receiver.

FIG. 10 shows another version of the filter impulse response previously shown in FIG. 6.

FIG. 19 shows an example of how an active OTFS relay system may operate between an OTFS transmitter and receiver.

DETAILED DESCRIPTION

Figure 1A:
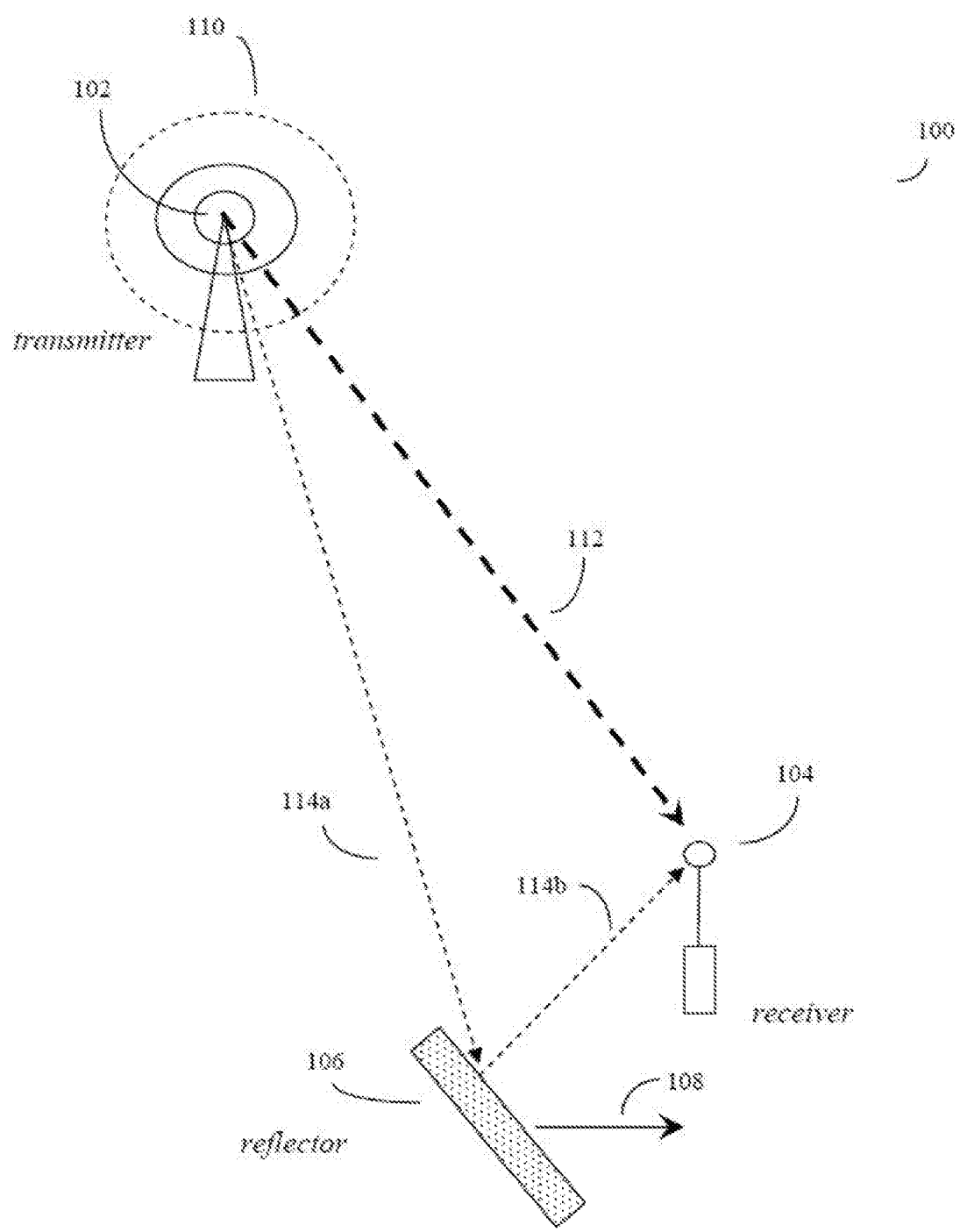
FIG. 1A shows ae example of a simplified model of a wireless data channel connecting a single transmitter and a single receiver. This simplified model has only one signal reflector. Due to speed of light considerations, as wireless waveforms travel between the transmitter and the receiver, bounce off of reflectors, and experience Doppler frequency shifts caused by movement in any of transmitters, receivers and reflectors, these wireless signals are distorted by the communications channel. As will be discussed herein, mathematically these effects may be modeled by a Symplectic plane representation.

Techniques, systems, and devices are described for implementing a data transmission and reception process.

The disclosed technology is based in part on the insight that in contrast to prior art methods such as the earlier Clarke-Jakes model, that tended to view variations in signal strength (e.g. occasional signal fading, how long a signal remains coherent, how large a range of signal frequency ranges can be expected to be coherent) as something that can only be handled by statistical methods, superior results can be obtained if the underlying structure of a data channel (communications channel) is exposed, and the various causes of signal distortion (e.g. various reflections, frequency shifts, other shifts and the like) are instead sorted out or "solved for".

Some embodiments disclosed herein focus on wireless data channels that transmit data (often using radio signals of various frequencies up into the microwave frequencies and beyond) though three dimensions of space (often on earth, where the "space" may be filled with air and even other natural airborne objects such as clouds, raindrops, hail and the like) and one dimension of time. However many of the concepts disclosed herein can also be used for other data channels operating in other media (e.g. water, conductive metals, transparent solids, and the like). Thus use of wireless examples is not intended to be limiting.

Some embodiments use of modern electronic components, such as processors (e.g. microprocessors, which can even be commonly used processors such as the popular Intel x86 series of processors), and digital signal processors; and often will employ modern software configured wireless transmitters and receivers which can, for example, be implemented by various field programmable gate arrays (FPGA). Here the methods of Harris, "Digital Receivers and Transmitters Using Polyphase Filter Banks for Wireless Communications", IEEE transactions volume 51 (4), April 2003, pages 1395-1412. Application specific integrated circuits (ASICs) and other types of devices and methods may also be used.

Some disclosed embodiments relate to certain methods of transmitting pilot symbols and data symbols in the form of orthogonal time shifted and frequency shifted wireless waveform bursts, often referred to in this specification as OTFS pilot and data symbols and OTFS pilot and data waveform bursts. These OTFS waveform bursts can be implemented by various methods, such as those previously disclosed in parent applications U.S. 61/349,619, U.S. Ser. Nos. 13/430,690, 13/927,091 as well as U.S. Pat. Nos. 8,547,988 and 8,879,378; all of which are incorporated herein by reference in their entirety. Although these earlier disclosures thus contain a more detailed discussion of various aspects of OTFS waveform technology, as well as a more detailed discussion as to various methods to implement OTFS symbols and data frames, some important aspects from these disclosures will be reiterated herein.

At least as far as transmitting data is concerned, OTFS methods work by essentially spreading out each transmitted data bit throughout a plurality of orthogonal time shifted and frequency shifted wireless waveform bursts so that essentially every data bit ends up traveling from the destination to the receiver through multiple mutually orthogonal wireless waveform data bursts, all based on permutations of the same basis waveform, distributed over a given time and frequency range. For efficiencies sake, a large number of data symbols (each potentially comprising multiple bits of data) are handled simultaneously.

Typically the OTF math operations (usually handled by the transmitter processor) will repackage these data symbols into a plurality of OTFS data symbols, each OTFS data symbol in essence containing a portion of each data bit being transmitted). These OTFS data symbols are used to control the modulation of each different OTFS waveform burst, and the data is transmitted in the form of OTFS symbol modulated OTFS waveform bursts. With regards to receiving data, the receiver essentially has to wait to receive an entire batch (data frame) of OTFS symbols before it can begin the process of using matrix math to in essence use the received OTFS symbols to solve for the originally transmitted data bits. Note however that OTFS pilot symbols are not used to transmit data, and thus need not be subject to these limitations.

Thus in contrast to legacy communications methods, where some bits may be subject to fading, and other bits will get through OK, with OTFS methods, because each data bit travels from the transmitter to the receiver by multiple different waveforms, all data bits, at least within a group of similarly treated data bits (often termed a data frame) will end up experiencing the same channel conditions.

To briefly summarize some aspects of these earlier disclosures, in some embodiments, data symbols intended for transmission as OTFS symbols may, on the transmitter side, be distributed, usually automatically using at least one processor and appropriate software, over various symbol matrices or "data frames". These may be N·N matrices, or even N·M matrices (where M is different from N). These symbol matrices or data frames are then used as input to control the modulation of the system's wireless transmitter(s). Specifically the data symbols intended for transmission may be used to weigh or modulate a family of cyclically time shifted and cyclically frequency shifted waveforms.

This can be done by, for example, at the transmitter using the data symbols to control the operation of a bank of wireless signal modulators (e.g. QAM modulators, which may be implemented using the previously discussed methods of Harris or other methods). The resulting output can, for example, result in a plurality of bursts of QAM modulated waveforms, over a plurality of frequencies and time shifts, which can later be used by the receiver to help identify the structure of the data channel (e.g. positions and velocities of various reflectors).

Although these waveforms may then be distorted during transmission, assuming that the original time-frequency origin of the various waveforms can be determined by the receiver, then the basic time and frequency structure of the received waveforms can be used by the system's receivers, along with appropriate receiver based deconvolution methods, to correct for these distortions and determine the originally transmitted data symbols.

However as is discussed herein, there is more than one way to do this. Here an alternative approach for accomplishing the same objectives is being disclosed.

Some embodiments relate to an automated method of wirelessly transmitting and receiving data (e.g. a plurality of data symbols) over an impaired data channel connecting at least one wireless transmitter and at least one wireless receiver. Here assume that, as discussed elsewhere in this document, this impaired data channel is an impaired wireless data channel (100), such as space filled with various reflectors (106), which impairs the waveforms (112, 114a, 114b) as they travel through the data channel. According to the invention, this impairment is at least partially describable according to a 2D channel state of the channel (or as shown in FIG. 2, a Finite channel $h_{eqv,f}$), such that the transmitted wireless waveforms produce channel-convoluted waveforms at the least one wireless receiver, as per FIGS. 1A-1D and FIG. 2 (output: y).

This method can comprise using at least one transmitter (102) and transmitter processor (e.g. FIG. 1A 102p) to package the data into at least one N×M 2D array of data symbols, and use an encoding process to transmit this array of data symbols so that every data symbol is spread over a time and frequency range of wireless signals configured to capture a 2D channel state of this impaired data channel. Here the at least one receiver processor (e.g. FIG. 1A 104p) can receive these wireless signals, in a preferred embodiment use information pertaining to the 2D channel state to correct these signals for the data channel impairments. The receiver processor can then use an inverse of the encoding process to decode and extract this plurality of data symbols. Alternatively the correction of signals for data channel impairments can be done after the receiver has decoded and extracted the plurality of data symbols.

Many methods can be used to implement OTFS data transmission methods. Some of these earlier methods were discussed in earlier applications such as U.S. patent applications 62/027,231, 62/129,930, Ser. Nos. 13/927,091; 13/927,086; 13/927,095; 13/927,089; 13/927,092; 13/927,087; 13/927,088; 13/927,091; 14/583,911 and 61/664,020.

In some embodiments, however the OTFS data transmission methods may be implemented by transforming the at least one N×M 2D array of data symbols into at least one block or array of filtered OFDM symbols. This can be done, for example, using one dimensional Fourier transforms and a filtering process or algorithm. This at least one block or array of filtered OFDM symbols may then be transformed into at least one block or array of OTFS symbols using various types of two dimensional Fourier transforms. These results (referred to as "material") will typically be stored in transmitter memory (102m). This material can then be divided into various wireless frequency sub-bands by various methods, such as by using a transmitter (102c) that employs a series of M narrow-band filter banks, thereby producing a series of M mutually orthogonal waveforms over at least N time intervals. These can then be transmitted over at least N time intervals.

Depending on the specifics of the situation, gaps or "guard bands" in both time and frequency may be imposed to minimize the possibility of inadvertent cross talk between the various narrow-band filters and time intervals prior to transmission. Depending on the characteristics of the data channel, any such gaps or guard bands can be increased or decreased or set to zero as situations warrant.

Alternatively and more specifically, the encoding process discussed above can encode the at least one N×M 2D array of data symbols onto at least one symplectic analysis compatible manifold (or other data format or data manifold) distributed over a column time axis of length T and row frequency axis of length F, thereby producing at least one Information manifold, typically stored in transmitter memory (102m).

Here the information manifold essentially holds the data symbols in a form where they can be subsequently be operated on by the desired OTFS transformation operation, such as a symplectic 2D Fourier transform, a discrete symplectic 2D Fourier transform, a finite symplectic Fourier transform, and the like. Typically if any sort of spreading operation is done on the data symbols, it often will also be done at or prior to the information manifold stage.

Then, typically using at least one transmitter processor, the OTFS processor (102p) and/or transmitter (102c) can transform the at least one Information manifold according to a 2D "symplectic-like" Fourier transform. Here "symplectic-like" is intended to encompass any of the previously discussed symplectic 2D Fourier transforms, discrete symplectic 2D Fourier transforms, and finite symplectic Fourier transforms. This operation will thus produce at least one 2D Fourier transformed Information manifold, which again can be stored in transmitter memory (102m).

The OTFS transmitter (102c) will typically transmit this at least one 2D Fourier transformed Information manifold as a series of "M" simultaneous narrow band waveforms, each series over consecutive time intervals, until the entire 2D Fourier transformed Information manifold has been transmitted.

For example, the transmitter processor (102p) can operate, often on a one column at a time basis, over all frequencies and times of this 2D Fourier transformed Information manifold. Here the transmitter processor can select a given column by at location n (where n can vary from 1 to N) and transmit a column with a width according to a time slice of duration proportional to Tµ, where µ=1/N. The processor (or transmitter 102c) can then pass those frequencies in the column slice of this 2D Fourier transformed Information manifold (e.g. frequencies corresponding to this transmitting time slice) through a bank of at least M different, non-overlapping, narrow-band frequency filters. This produces M mutually orthogonal waveforms. The processor can then transmit these resulting filtered waveforms as a plurality of at least M simultaneously transmitted mutually orthogonal waveforms, over different transmitted time intervals (e.g. one column at a time), until an entire 2D Fourier transformed Information manifold has been transmitted.

Again, depending on the specifics of the situation, gaps or "guard bands" in both time and frequency may be imposed to minimize the possibility of inadvertent cross talk between the various narrow-band filters and time intervals prior to transmission. Depending on the characteristics of the data channel, any such gaps or guard bands can be increased or decreased or set to zero as situations warrant.

The various OTFS waveforms will then pass through the communications channel/data channel as shown in FIGS. 1A-1D and FIG. 2, and accumulate various distortions in the process before they reach the OTFS receiver. Put alternatively, the impaired data channel impairs these various waveforms (as per FIGS. 1B-1D), and assuming that the OTFS parameters have been appropriately set for that data channel, then this impairment should be at least partially describable according to a 2D channel state of this channel. The net result is that the wireless receiver receives channel-convoluted OTFS waveforms.

The one or more OTFS receivers (104) can in turn receive this (channel-convoluted) version of this at least one 2D Fourier transformed Information manifold by essentially performing the inverse of the transmitting process. However due to the channel convolution effects (such as Doppler effects), what were originally M narrow band waveforms at M original frequencies may now be more than M narrow band waveforms at a different range of frequencies. Further due to speed of light delay effects due to various waveforms bouncing off of various reflectors, the timing of the receipt of the original signals may also be different. So the receiver has a challenging task to capture everything, and normally it will supersample or oversample the various waveforms on a finer mesh time and frequency grid or series of bins so as to try to capture everything. Thus in FIGS. 1B-1D, notice that the receiver OTFS bins have a smaller time-frequency size than the transmitter OTFS grids, which is intended to represent this oversampling process.

Thus, of over at least all frequencies and times of the originally transmitted 2D Fourier transformed Information manifold (and typically over a greater range of frequencies and times), the receiver will use it's at least one receiver processor to select a receiving time slice that is less than or equal to the duration of the transmitted time intervals. The receiver will then receive these channel convoluted waveforms at the various receiving time slices, and analyze these waveforms according to a receiving bank of at least M different, non-overlapping, narrow-band frequency filters. As previously discussed, typically the receiver will oversample and use a multiple of M narrow band filters to do this, and also cover a greater range of frequencies (so that it doesn't miss expected Doppler shifted signals as well). The receiver will thus receive these channel-convoluted waveforms over every receiving time slice until an approximation (channel convoluted version) of the originally transmitted 2D Fourier transformed Information manifold has been received. This will typically be stored in receiver memory (104m).

Figure 7:
FIG. 7 shows an example of OTFS transmission and reception according to the disclosures herein. The process starts on the left, where data is packaged for transmission, and optionally precoded to correct for known channel impairments (Pre). This material is then processed by a 2D Fourier Transform (such as a symplectic Fourier transform, discrete symplectic Fourier transform, or finite symplectic Fourier transform) (2D-FT$_s$). This material is then passed through a filter bank (FB) and transmitted over a series of time intervals Tμ. The wireless OTFS waveforms then pass through the communications or data channel (C), where they are subject to various distortions and signal impairments. At the receiver, the received waveforms are received according to a filter bank at various time intervals. The receiver filter bank (FB*) may be an oversampled filter bank (FB*) operating according to oversampled time durations that may be a fraction of the original time intervals Tμ. This oversampling enables the received signals to be better analyzed for channel caused time delays and frequency shifts at a high degree of resolution. The received material is then analyzed by an inverse 2D Fourier Transform (2D-FT$_s$) (which again may be a symplectic Fourier transform, discrete symplectic Fourier transform, or finite symplectic Fourier transform). The resulting material may then be further corrected for channel distortions (often using 2D channel state information) either before or after (shown here) the receiver 2D-FT$_s$ stage.

As is shown in FIG. 7, the receiver has still more work to do. The receiver must then correct for the channel convolutions, and eventually retrieve a version of the originally transmitted data symbols. To do this, the receiver may operate according to at least one of various options.

The receiver may, for example use an inverse of the 2D symplectic-like Fourier transform to transform the received, channel convoluted approximation of the originally 2D Fourier transformed Information manifold (stored in receiver memory 102m) into an approximation of the at least one received information manifold, and the use information pertaining to the 2D channel state to correct the various received information manifolds for these data channel impairments.

Alternatively, the receiver may first use information pertaining to the 2D channel state to correct the received, channel convoluted approximation of the originally 2D Fourier transformed Information manifold (stored in receiver memory) for the data channel impairments. The receiver processor can then use the inverse of the 2D symplectic-like Fourier transform to in turn produce at least one received information manifold, and from there extract the data symbols, completing the process of transmitting and receiving data.

Ideally, OTFS methods will spread any given data symbol throughout all transmitted time and frequency waveforms, ideally in relatively uniformly distributed manner. In some embodiments, it may also be useful to further encode or modulate the transmission so that the originally transmitted time and frequency of the received waveforms can also be distinguished by the receiver. Although the 2D symplectic-like Fourier transform methods described herein can do a relatively good job of handling this distribution, in some embodiments it may be useful to implement an additional spreading operation to insure that the data symbols are uniformly distributed.

To do this, in some embodiments, the transmitter processor (102p) may further transform the at least one N×M 2D array of data according to a spreading operation, either prior to or after encoding at least one N×M 2D array of data symbols onto the at least one symplectic analysis compatible manifold. Many such spreading functions can be used for this, such as a 2D chirp operation, for example. If such spreading operations are done, then at the receiving end, the receiver will need to use an inverse of this spreading operation in order to decode and extract the data symbols from the various received information manifolds.

Figure 3:
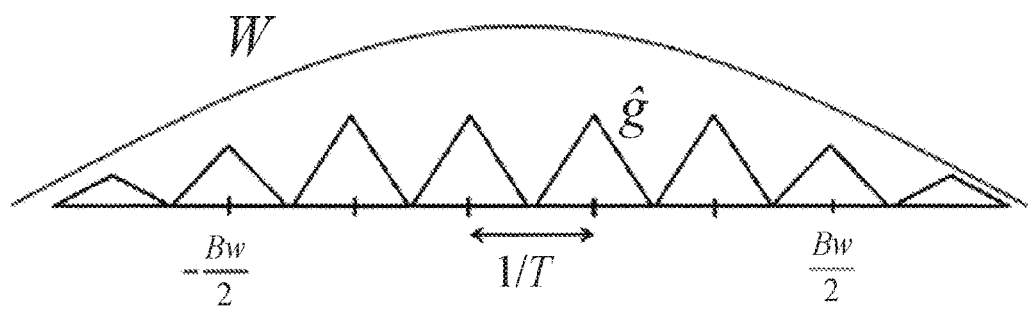
FIG. 3 shows a representation of one possible structure of a finite OTFS modulation map which in some embodiments may be used for the various OTFS waveform bursts disclosed herein.

FIG. 3 shows a representation of one possible structure of a finite OTFS modulation map which in some embodiments may be used for the various OTFS waveform bursts disclosed herein.

Figure 4:
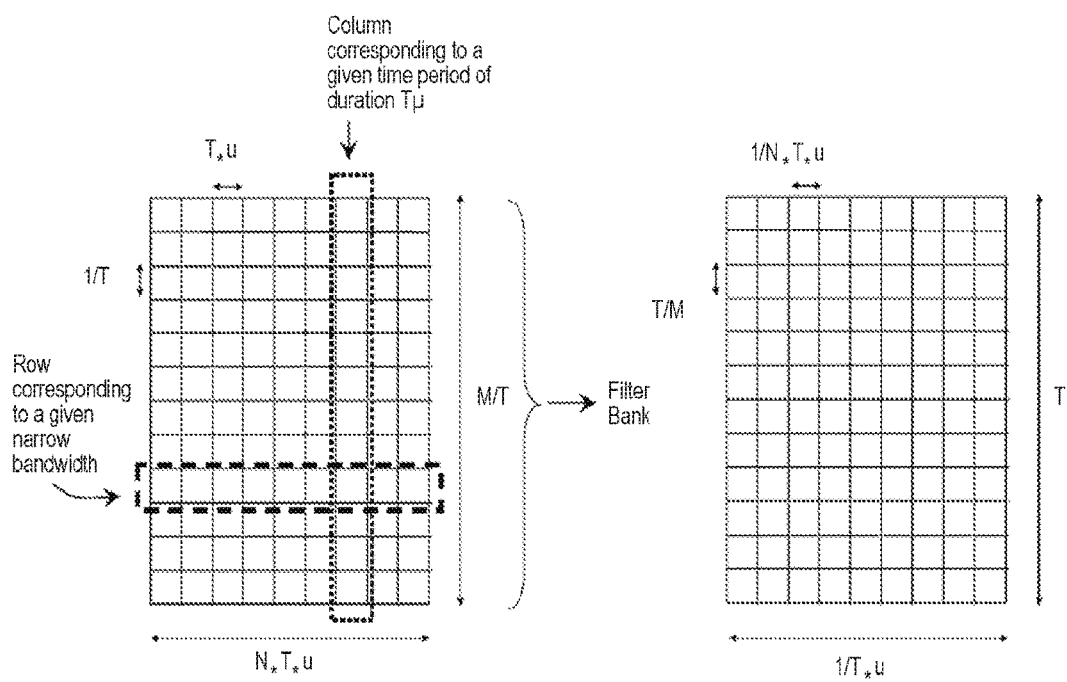
FIG. 4 shows some examples for a 2D Fourier transformed Information manifold configured to transmit information according to an N×M structure using M filtered OTFS frequency bands over N time periods, each time period of duration Tμ. Assume here that the OTFS transmitter is configured to use all of a given amount of bandwidth (which may be allocated according to Government regulations or other scheme) to transmit the OTFS signals as quickly as possible given the allowed amount of bandwidth. The allocated time duration and allocated bandwidth end up limiting the number of elements M and the corresponding amount of data that can be sent over this given time interval. Here in general, the bandwidth in frequency units (Hz) for each OTFS filtered frequency band $\omega_0$, is 1/Tμ. So if we wish to transmit all N columns over a minimum time interval of N*Tμ, then bandwidth considerations require that the M have a bandwidth no larger than 1/Tμ, and further that the bandwidth used by all M filtered OTFS frequency bands cannot exceed M/T, where T is the total amount of time used to transmit all N columns of the 2D Fourier transformed Information manifold.

FIG. 4 shows some examples for a 2D Fourier transformed Information manifold configured to transmit information according to an N×M structure using M filtered narrow OTFS frequency bands over N time periods, each time period of duration $T\mu$. In this example, each different narrow band OTFS frequency is represented by a given row, and each different time period is represented by a given column.

Assume here that the OTFS transmitter is configured to use all of a given amount of bandwidth (which may be allocated according to Government regulations or other scheme) to transmit the OTFS signals as quickly as possible given the allowed amount of bandwidth. In other words, here there are no guard intervals or gaps between the various time regions and frequency regions (although in some embodiments, such gaps may be introduced). The allocated time duration and allocated bandwidth end up limiting the number of elements M and the corresponding amount of data that can be sent over this given time interval. Here in general, the bandwidth in frequency units (Hz) for each OTFS filtered frequency band $\omega_0$, is $1/T\mu$. So if we wish to transmit all N columns over a minimum time interval of $N*T\mu$, then bandwidth considerations require that the M have a bandwidth no larger than $1/T\mu$, and further that the bandwidth used by all M filtered OTFS frequency bands cannot exceed M/T, where T is the total amount of time used to transmit all N columns of the 2D Fourier transformed Information manifold.

On the receiver end, the receiver (104) can receive the various 2D Fourier transformed Information manifolds according to receiving time slices and receiving banks of different, non-overlapping, narrow-band frequency filters that are generally similar to those used for the transmitter. Here an important exception, previously discussed, is that the receiver time slices and receiving banks of filters will generally operate with finer granularity—that is over smaller frequency bandwidths, and shorter time slices, but over a broader total range of frequencies and times. Thus the receiver bin structure will preferably oversample the corresponding transmitting time slices and transmitting banks of different, non-overlapping, narrow-band frequency filters previously used by the transmitter.

As can be seen in FIG. 4, the OTFS transmitter will typically transmit the resulting filtered waveforms (in this example over all rows and successive columns), until the entire 2D Fourier transformed Information manifold has been transmitted. However the transmitter can either transmit the successive columns (time slices) continuously and contiguously—that is without any time gaps in-between, as more of a series of continuous longer duration waveforms, or alternatively the transmitter can put some time spacing between the various successive columns, thus creating a more obvious series of waveform bursts.

Put alternatively, the transmitter can transmit the resulting filtered waveforms as either: 1) a plurality of at least M simultaneously transmitted mutually orthogonal waveforms over either different consecutive transmitted time intervals; or 2) a plurality OTFS data or OTFS pilot bursts comprising at least M simultaneously transmitted mutually orthogonal waveform bursts over different transmitted time intervals separated by at least one spacer time interval.

Figure 5:
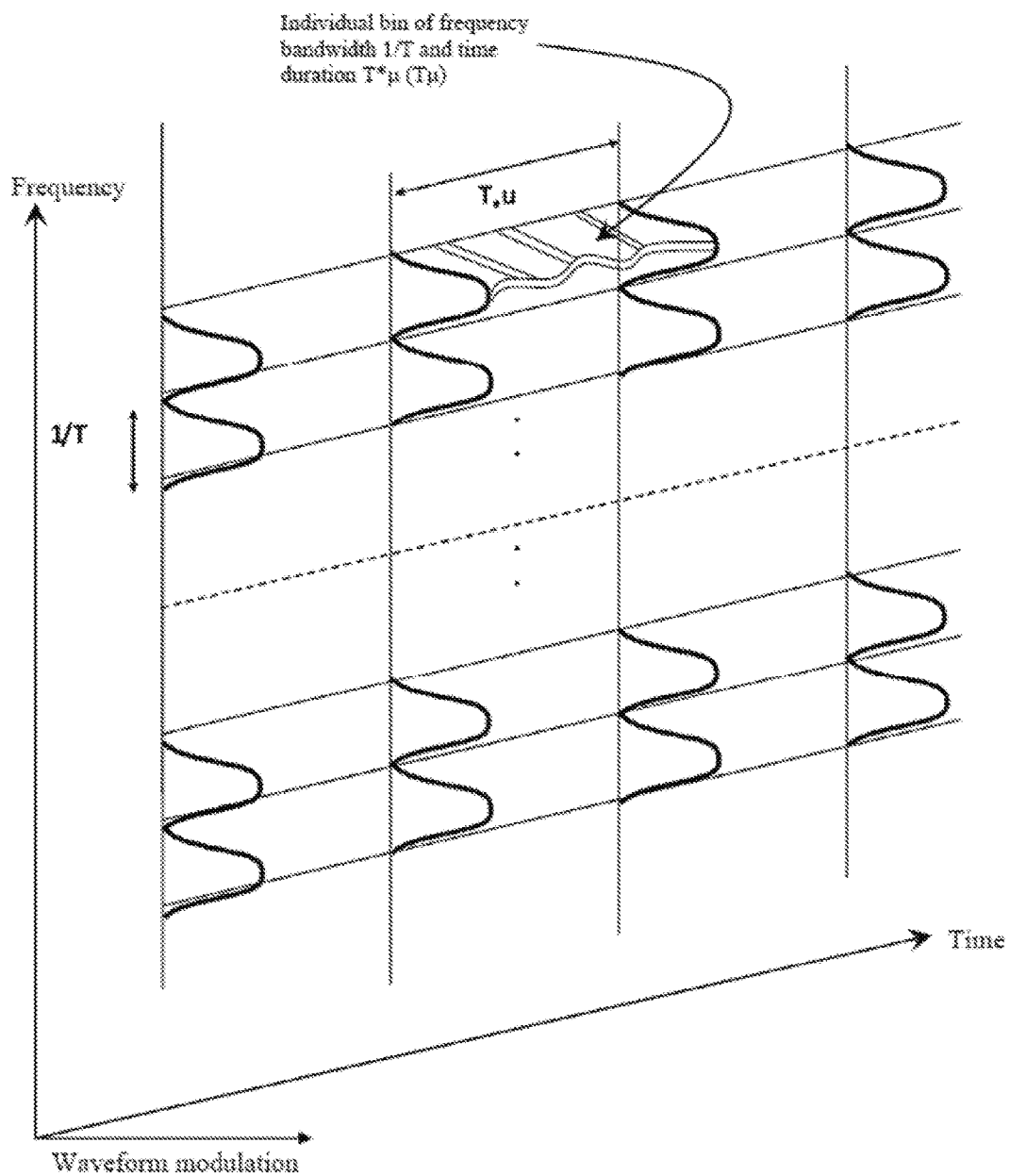
FIG. 5 shows an example of the M filtered OTFS frequency bands being simultaneously transmitted according to various smaller time slices Tμ. The repeating curved shapes show the center frequency for each filtered band according to $g(t \cdot e^{jk\omega_0})$. One of the transmitted bins of frequency bandwidth size 1/T and time duration T*μ (Tμ) is shown in more detail. Note that in this scheme, there are no gaps between the different time slices, and minimal if any separation between the frequency regions. In alternative schemes, additional time and/or frequency gaps may be used.

FIG. 5 shows an example of the M filtered OTFS frequency bands being simultaneously transmitted according to various smaller time slices $T\mu$. The repeating curved shapes show the center frequency for each filtered band according to $g(t \cdot e^{jk\omega_0})$. One of the transmitted bins of frequency bandwidth size $1/T$ and time duration $T*\mu$ is shown in more detail. Again, as previously discussed, in a preferred embodiment the OTFS receiver will use oversampling, and thus use finer granularity bins that nonetheless may extend over a broader range of times and frequencies so as to catch signals with high degrees of delay or Doppler frequency shift.

Put alternatively, in some embodiments, the previously discussed non-overlapping, narrow-band frequency filters may be configured to pass frequencies from the various 2D Fourier transformed $g(t \cdot e^{jk\omega_0})$, where j is the square root of −1, t corresponds to a given time slice of duration $T\mu$ chosen from a 2D Fourier transformed Information manifold, and k corresponds to a given row position in a given 2D Fourier transformed Information manifold, where k varies between 1 and M.

In this example, the bandwidth, $\omega_0$, in frequency units Hz, can be proportional to $1/T$, and T=M/(allowed wireless bandwidth).

Thus, as is also shown in FIGS. 4 and 5, the various 2D Fourier transformed Information manifolds can have overall dimensions $NT_\mu$, according to a time axis and M/T according to a frequency axis, and each "cell" or "bin" in the various 2D Fourier transformed Information manifold may have overall dimensions proportional to $T\mu$ according to a time axis and $1/T$ according to a frequency axis.

Figure 6:
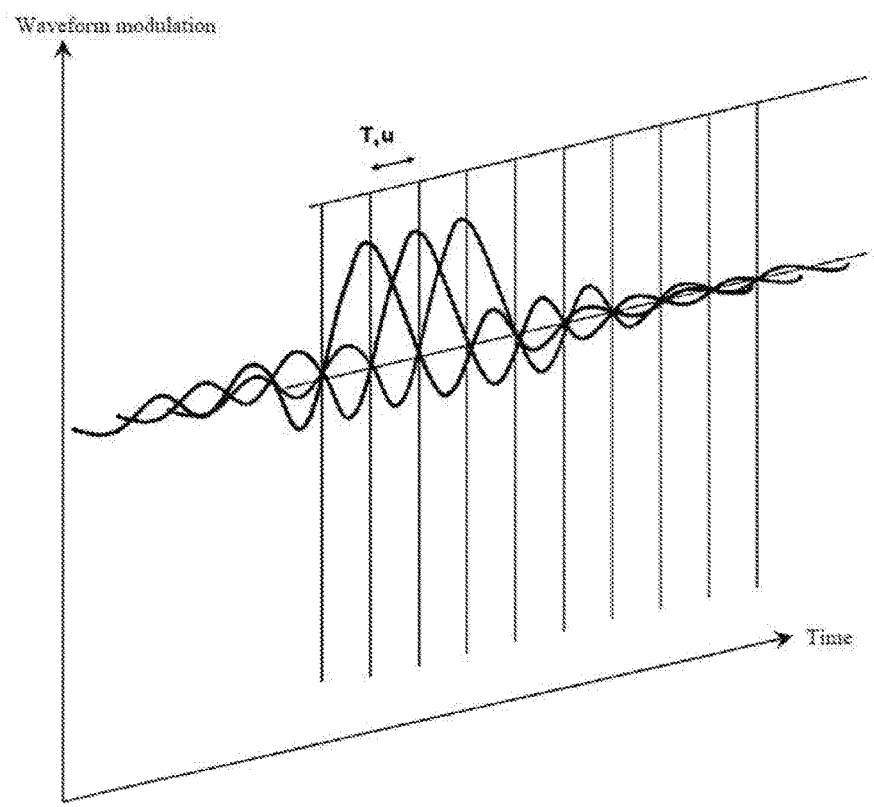
FIG. 6 shows another example of the OTFS waveforms being transmitted according to various smaller time slices Tμ. Here examples of the amplitude or modulation of the various waveforms as a function of time are shown.

FIG. 6 shows another example of the OTFS waveforms being transmitted according to various smaller time slices $T\mu$. Here examples of the amplitude or extent of modulation of the various waveforms as a function of time are also shown.

Optionally Distinguishing the Bin (Grid, Lattice) Time and Frequency Location of the Originally Transmitted OTFS Waveforms To help the OTFS receiver distinguish the various types of received signals, and distinguish direct signals from various time delayed and/or frequency shifted reflected signals, in some embodiments it may be useful to modulate the transmitted wireless OTFS waveforms using an underlying modulation signal that allows the receiver to distinguish where, on the original 2D time and frequency grid, a given received signal originated from. In earlier OTFS schemes, this underlying modulation scheme that enabled such time and frequency grid location distinguishability was accomplished using a scheme of cyclically time and frequency shifted mutually orthogonal waveforms to transmit the OTFS signals.

In some embodiments, the distinguishability of the grid, bin, or lattice locations of the originally transmitted OTFS waveforms can also be done using a similar dual cyclic scheme. However other methods are also possible. The main criterion is that if time and frequency distinguishability of the original locations of the waveforms is desired, the underlying modulation scheme should ideally create such distinguishability. In a preferred embodiment, there should be no ambiguity as to the originating location. In practice, some ambiguity may be tolerated, especially if certain aspects of the data channel are known in advance, and/or if suitable error correction mechanisms are employed.

In the present "symplectic" case, where each "row" of the 2D Fourier transformed Information manifold is passed through a narrow band filter that operates according to parameters such as $g(t \cdot e^{jk\omega_0})$ then the "$k\omega$" term lets the receiver distinguish any given incoming OTFS waveform by its originating "row" location "k". If the "t" term also varies for any given incoming OTFS waveform by its originating "column" location "t" then the receiver should also be able to determine the bin (grid, lattice) location of the various received waveforms by determining both the t (time related) and k (frequency related) values of the various received waveforms, and use these for subsequent deconvolution methods. However the t values should ideally be chosen to avoid or at least minimize any ambiguity here.

If under certain situations, further distinguishability of the bin (grid lattice) originating time and frequency origins of the received OTFS signals is desired, then an additional time and frequency varying, or time or frequency varying modulation scheme may also be imposed on the OTFS signals, prior to transmission, to allow the OTFS receiver to further distinguish the bin (grid, lattice) origin of the various received signals.

Alternative Methods of Using 2D Fourier Transformed Information Manifolds to Modulate OTFS Wireless Waveforms In alternative methods, either the Information manifold or the 2D Fourier transformed Information manifolds may be sampled and modulated using Dirac comb methods. These Dirac combs can be a periodic tempered distribution constructed from Dirac delta functions.

Alternative names for this type of method include impulse train and sampling functions. Essentially these Dirac comb methods capture many of the benefits of Fourier analysis, but operate according to a different underlying mathematical and computational framework. This alternative approach is also valid, but since the Fourier methods and filter banks are easier to understand, this disclosure thus focuses on the symplectic Fourier and filter bank approach.

System Example

FIG. 7 shows an example of OTFS transmission and reception according to the disclosures herein. The process starts on the left, where data is packaged for transmission, and optionally precoded to correct for known channel impairments (Pre). This material is then processed by a 2D Fourier Transform (such as a symplectic Fourier transform, discrete symplectic Fourier transform, or finite symplectic Fourier transform) (2D-FT$_s$). This material is then passed through a filter bank (FB) and transmitted over a series of time intervals Tµ. The wireless OTFS waveforms then pass through the communications or data channel (C), where they are subject to various distortions and signal impairments. At the receiver, the received waveforms are received according to a filter bank at various time intervals. The receiver filter bank (FB*) may be an oversampled filter bank (FB*) operating according to oversampled time durations that may be a fraction of the original time intervals Tµ. This oversampling enables the received signals to be better analyzed for channel caused time delays and frequency shifts at a high degree of resolution. The received material is then analyzed by an inverse 2D Fourier Transform (2D-FT$_s$) (which again may be a symplectic Fourier transform, discrete symplectic Fourier transform, or finite symplectic Fourier transform). The resulting material may then be further corrected for channel distortions (often using 2D channel state information) either before or after (shown here) the receiver 2D-FT$_s$ stage.

Returning to FIGS. 1A-1D, and now using the present embodiment of OTFS, the consequences in terms of how OTFS methods may be used to characterize or "acquire" impaired data channels remain much the same regardless of the details of the particular OTFS modulation scheme used.

To summarize, in the methods described herein the impaired data channel may be an impaired wireless data channel comprising at least one wireless reflector, each reflector comprising a reflector location, reflector velocity, reflector frequency shift comprising a reflector velocity caused Doppler shift, and at least one reflector coefficients of wireless reflection.

The various OTFS wireless transmitters will typically comprise a transmitter location, transmitter velocity, transmitter frequency and transmitter frequency shift. Here the transmitter frequency shift will be caused by a change in the transmitter's frequency according to a transmitter velocity caused Doppler shift. Similarly each OTFS wireless receiver will typically comprise a receiver location, receiver velocity, receiver frequency and receiver frequency shift. This receiver frequency shift will also be a change in the receiver's frequency according to a receiver velocity caused Doppler shift.

The 2D channel state will typically comprise information pertaining to the relative locations, velocities, velocity induced frequency shifts caused by transmitter Doppler shifts, receiver Doppler shifts, reflector Doppler shifts, and reflector coefficients of reflection of the various transmitters, receivers, and reflectors.

The OTFS methods described herein can use at least one transmitter and at least one processor to transmit direct OTFS data waveforms or waveform bursts. These direct OTFS data waveforms or waveform bursts can be viewed as comprising a plurality of OTFS data symbols $D_{pt,pf}$ (which are related to the underlying standard data symbols by the various 2D symplectic Fourier transform methods described previously) transmitted as OTFS data symbol waveforms or waveform bursts $D_{pt,pf} W_p(pt, pf)$, over a plurality of combinations of times pt and frequencies pf, (corresponding to the previously discussed N and M grid coordinates) where each pt and pf are unique data time-frequency coordinates chosen from a two dimensional data OTFS time-frequency grid (or lattice)

The OTFS receivers described herein can be configured to receive at least these data waveforms or waveform bursts according to at least a two dimensional data OTFS time-frequency bin structure with bin sizes and bin-coordinate positions proportional to a sample or oversample of the OTFS time-frequency grid used by the transmitter.

As previously discussed, upon propagation through the impaired data channel, the direct OTFS data waveforms or waveform bursts then travel over at least one path, which mathematically can be described using the Delay Doppler plane. This at least one path can comprise at least one of: a: direct OTFS data waveforms or waveform bursts traveling directly from the transmitter(s) to the receiver(s); and/or b: replica OTFS data waveforms or waveform bursts comprising direct OTFS data waveforms or waveform bursts that have reflected off the various reflectors before reaching the receiver(s), thereby producing direct OTFS waveforms or waveform bursts that are further reflector time-delayed and reflector frequency-shifted the receiver(s).

Thus at the receiver(s), a resulting combination of the transmitter frequency shifted and receiver frequency shifted direct OTFS data waveforms or waveform bursts and any replica OTFS data waveforms or waveform bursts produces channel-convoluted OTFS data waveforms or waveform bursts.

At the OTFS receiver(s), the receiver can use its (preferably oversampled) lattice or bin structure to receive these channel-convoluted OTFS data waveforms or waveform bursts. The receiver can then use the 2D channel state and at least processor for various tasks, such as:

Determine the 2D channel state of the impaired data channel connecting the transmitter(s) and receiver(s).

Precode at least some of the direct data waveforms or waveform bursts at the wireless transmitter(s) to pre-compensate for the impaired data channel Deconvolute at least some of the channel-convoluted data waveforms or waveform bursts at the at least one wireless receiver, thereby deriving at least an approximation of the originally transmitted data symbols.

As previously discussed, in this terminology, $D_{pt,pf}$ corresponds to a contents of (time-frequency) bin coordinate (pt, pf) from the 2D Fourier transformed Information manifold, and $W_p$(pt, pf) corresponds to the output of filter bank $g(t \cdot e^{jk\omega_0})$ where k=pf.

Note that as was previously discussed extensively in parent U.S. application Ser. No. 14/583,911 the entire contents of which are incorporated herein by reference, often it is useful to obtain this 2D channel state information by transmitting and receiving at least one pilot symbol specifically designed for purposes of 2D channel state detection, rather than by itself directly transmitting data.

Thus some embodiments may be an automated method of acquiring a 2D channel state of an impaired data channel connecting at least one transmitter and at least one receiver. As previously discussed, and also as shown in FIG. 1, this impaired data channel will generally comprise at least one reflector. Each reflector will in turn comprise at least a reflector location (e.g. physical location in the data channel), reflector frequency shift, and at least one reflector coefficient of reflection. As will be discussed, reflectors may also have additional properties as well.

The OTFS transceiver (i.e. transmitter to receiver system) can be expressed mathematically as a mathematical transformation converting the fading wireless channel to special two dimensional coordinate system where the channel acts by convolution so that the fading phenomena is substantially (ideally completely) mitigated. More formally, the OTFS transceiver (transmitter receiver pair) can be described as a pair of linear transformations (M;D) where M is called modulation map and D is called demodulation map and is the inverse of M. The domain of the modulation is the vector space of complex valued functions on a two dimensional periodic domain $Z^\square$. However in the following section, we will be describing this process in more standard engineering terms. Here we will initially focus on OTFS pilot bursts but as will be discussed, the concepts are also applicable to OTFS data bursts as well.

Further Engineering Level Discussion

Figure 2:
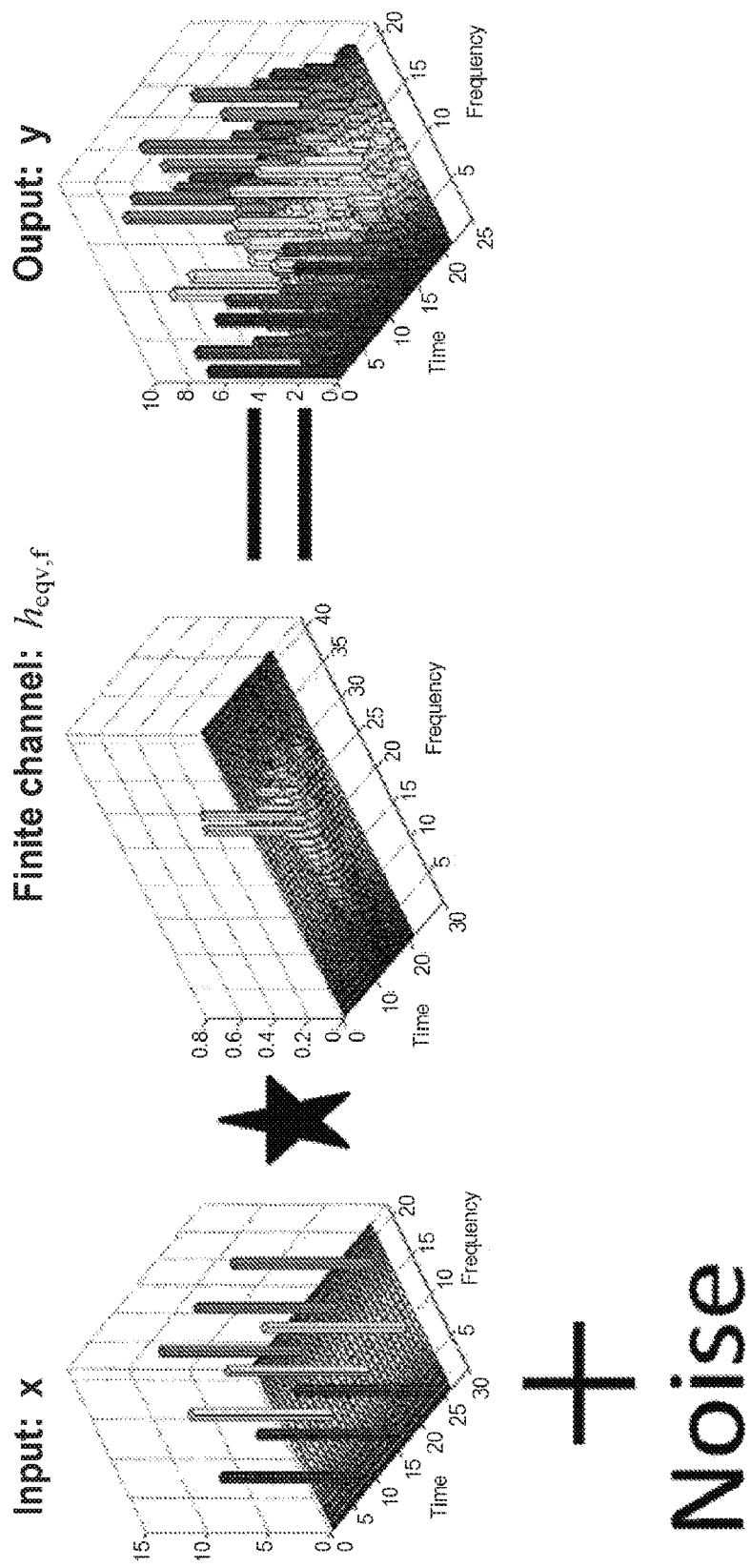
FIG. 2 shows a more real-life example of FIG. 1D, where the input: X on the left hand diagram corresponds to the transmitter OTFS time frequency grid, the communications/data channel distortions (represented at least in part by the 2D channel state of the data channel) on the middle diagram correspond to the Finite channel: $h_{eqv,f}$, and the resulting channel-convoluted OTFS waveform bursts are shown on the output: y on the right hand diagram.

FIG. 1A shows a simplified model of a wireless data channel (100), here connecting a single transmitter (102) and a single receiver (104). Here (for simplicity) assume that the transmitter and receiver are not moving with respect to each other (although often they may also be moving as well). This data channel is impaired by the presence of one moving reflector (106) moving at a defined velocity (108). Some OTFS pilot waveform bursts (110) (112) travel directly from the transmitter to the receiver. Other OTFS pilot bursts are replica OTFS pilot bursts that have reflected off of the moving reflector (114*a*, 114*b*), and are therefore reflector time-delayed and reflector frequency shifted. The receiver thus receives a combination of the direct and replica OTFS pilot bursts as channel-convoluted OTFS pilot bursts. The order of arrival of the OTFS pilot bursts to the receiver is 1) Direct OTFS pilot burst (112) and then frequency shifted replica OTFS pilot burst (114*b*).

Each transmitter will generally comprise a transmitter location (e.g. physical location in the data channel) and transmitter frequency shift, and each receiver will similarly comprising a receiver location (physical location in the data channel) and receiver frequency shift. The 2D channel state will generally comprise information pertaining to the relative locations, frequency shifts, and reflector coefficients of reflection of at least some of the various transmitters, receivers, and reflectors operating in the data channel.

According to the invention's methods, the method will use this at least one transmitter, controlled by at least one transmitter processor, to transmit direct OTFS pilot (waveform) bursts. These direct OTFS pilot bursts will generally comprise a plurality of OTFS pilot symbols $P_{pt,pf}$ transmitted as OTFS pilot symbol waveform bursts $P_{pt,pf} \cdot W_p$(pt, pf), over a plurality of combinations of times pt and frequencies pf. Here each of the pt and pf may be unique pilot time-frequency coordinates chosen from a two dimensional pilot OTFS time-frequency grid that is typically undersampled with respect to the receiver OTFS time-frequency grid. All OTFS pilot symbol waveform bursts $P_{pt,pf} \cdot Wp$(pt, pf) (or at least all transmitted at non-zero power levels) are mutually orthogonal waveform bursts derived from cyclically time and frequency shifted versions of a same OTFS pilot basis waveform $W_p$.

In some embodiments, the OTFS transmitter is defined in somewhat different terms, but the underlying concepts are similar. For example, a continuous OTFS transmitter can be described in terms of a communication lattice that is undersampled with respect to the OTFS receiver's communication lattice. OTFS waveforms are based on generator waveforms that are mutually orthogonal, and are subject to a 2D filter process.

Because these OTFS pilot symbol waveform bursts are not used to transmit data, but rather are used to characterize (acquire) the 2D channel state of the data channel, there is a fair amount of flexibility possible in the choice of OTFS pilot symbol waveform bursts. However one requirement is that the plurality of OTFS pilot symbols $P_{pt,pf}$ (transmitted as OTFS pilot symbol waveform bursts $P_{pt,pf} \cdot W_p$(pt, pf)) should comprise at least one non-null OTFS pilot symbol $P_{pt,pf}$ that is transmitted as an OTFS pilot symbol waveform burst $P_{pt,pf} \cdot W_p$(pt, pf). The power levels should be chosen so that this OTFS pilot symbol should be detectable by at least one receiver. In a preferred embodiment, the OTFS pilot symbol will also be chosen so that it can be identified by the receiver as a pilot symbol, and not be confused as being an OTFS data symbol.

In some embodiments, at least some of the plurality of OTFS pilot symbols can be null pilot symbols, which instruct the transmitter to not apply any power to the underlying $W_p$(pt, pf) waveform (e.g. $P_{pt,pf} \cdot W_p$(pt, pf)=0). These null pilot symbols are intended to create at least some empty pt and pf unique pilot time-frequency coordinates on the two dimensional pilot OTFS time-frequency grid where no waveform burst is transmitted. These empty regions make it easier for the receiver to detect any channel convoluted OTFS pilot bursts that have been projected by the channel onto that (what should otherwise be) empty grid location.

Alternatively, in some embodiments, at least some of the plurality of OTFS pilot symbols can be transmitted as a series of uniform or standardized background pilot symbols (and associated waveforms) intended to create a uniform background of pt and pf unique pilot time-frequency coordinates chosen from the two dimensional pilot OTFS time-frequency grid. Here the transmitter will transmit the $P_{pt,}$ $_{pf}W_p$(pt, pf) with power. These background pilot symbols are intended to create a standardized background to again enable projections of channel-convoluted non-null (regular) OTFS pilot bursts onto this uniform background to be detectable and quantifiable by the receiver(s).

Regardless of choice of pilot symbols and pilot symbol waveform bursts, the receiver will be configured to receive at least these pilot bursts (in some embodiments, the receiver will also receive OTFS data bursts, but this is not required) according to at least a two dimensional pilot OTFS time-frequency bin structure with bin sizes and bin-coordinate positions proportional to the OTFS time-frequency grid used for pilot and data transmission. Here the resolution of the receiver bins will be oversampled with respect to the transmitter grid structure in that they will typically be at least equal to, and preferably greater than, the resolution of the transmitter grid structure. The general idea is that the receiver bin structure should be chosen to be sensitive to data channel caused delays and frequency shifts, and generally a finer (smaller) receiver bin structure will be more sensitive to these effects. Note that of course the practical constraints of receiver design, and also the fact that a finer (smaller) receiver bin will in essence capture fewer photons of OTFS waveform energy on a per bin basis. Thus at some point, an extremely fine bin structure will be subject to diminishing returns due to noise limitations. Thus the receiver bins cannot be infinitely small bins in time and frequency.

Figure 1B:
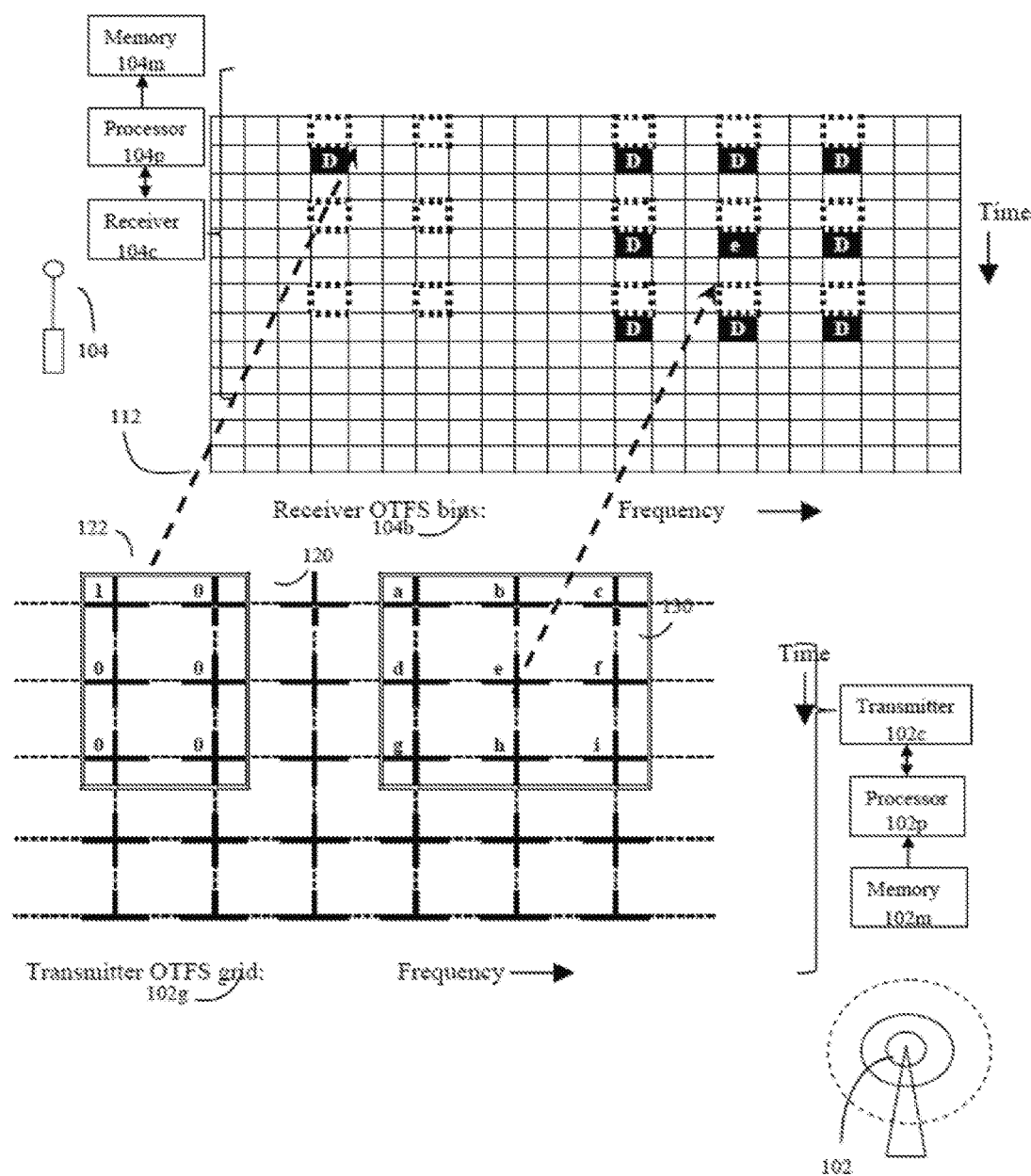
FIG. 1B shows how the invention's OTFS transmitters and OTFS receivers can use transmitter and receiver processors, along with associated memory, to transmit OTFS pilot and data symbols (using their associated OTFS waveforms, times, and frequencies) according to the transmitter's OTFS time-frequency grid or lattice, and receive OTFS symbols (using their associated OTFS waveforms, times, and frequencies) according to the receiver's corresponding OTFS time-frequency bin structure. The receiver's bin structure is oversampled (has a finer bin structure) relative to the OTFS time-frequency grid used to transmit the pilot and data samples.

FIG. 1B shows how both the OTFS transmitter (102) and OTFS receivers (104) generally use transmitter and receiver processors (102*p*) (104*p*), in addition to the transmitter and receiver circuitry (102*c*), (104*c*), along with associated memory (102*m*), (104*m*), to transmit OTFS symbols (using their associated OTFS waveforms, times, and frequencies) from the transmitter OTFS grid (102*g*), and receive OTFS symbols (using their associated OTFS waveforms, times, and frequencies) into the receiver OTFS bins (104*b*).

FIG. 1B also shows how the direct OTFS pilot bursts (112) and any OTFS data bursts are received at the receiver. Here the transmitter (102) transmits various types of OTFS waveform bursts, such as various OTFS pilot symbol waveform bursts 120) and various OTFS data symbol waveform bursts (130) spaced by various time and frequencies according to transmitter OTFS grid structure (102*g*).

Here (120) represents the two dimensional pilot OTFS time-frequency grid with OTFS pilot symbol waveform bursts $P_{pt,pf}W_p$(pt, pf). With regards to optional transmission of data, (130) represents the two dimensional OTFS data time frequency grid with OTFS data symbol waveform bursts $D_{dt,df}W_d$(dt, df). Although there is no absolute requirement that the OTFS pilot symbols and OTFS data symbols be transmitted and received according to their relative positions in the same transmitter OTFS grid (102*g*) and receiver OTFS bin (104*b*) structures, often the pilot and data symbols will be transmitted and received according to the same grid and bin structure, and thus this more common option is shown here.

The transmitter transmits at least one positive energy OTFS pilot symbol burst (1) (122) (in this example surrounded by a number of empty (0) or background spacers which may have zero energy). Other options are also possible, and these will be discussed later in this specification. In this example, the transmitter is also sending a number of OTFS data symbol waveform bursts (130) at other time-frequency locations along the same transmitter OTFS grid (102*g*). Here the direct path (112) that these waveform bursts use to travel through the data channel is shown.

The receiver (102) is configured to receive the channel convoluted OTFS symbols typically according to a receiver time-frequency bin structure (104*b*) that is usually finer grained (higher resolution) than the transmitter grid (102*g*). Here using such a higher resolution receiver bin resolution (finer divisions in time and frequency) (104*b*) is generally preferred higher resolution bins help the receiver better resolve the 2D channel state of the data channel. As a rule of thumb, it is desirable to have each receiver bin be at least twice the resolution (e.g. occupy less than half of the time and frequency space) as the corresponding spacing of the transmitter OTFS grids. Often still higher bin resolutions may be desirable.

In FIG. 1B, assuming that the receiver (104) and transmitter (102) are not moving with respect to each other, the only data channel effect with regards to the direct OTFS bursts (112) is that all bursts are time delayed according to the distance between the transmitter and receiver. (In this wireless example, assume that these time delay effects are speed of light related.) If the transmitter (102) and receiver (104) had been moving with respect to each other, then all bursts would have been also displaced along the receiver OTFS bin frequency axis due to Doppler effects.

In some embodiments, where the transmitter (102) (specifically the transmitter processor 102*p* and transmitter memory 102*m*) will select the OTFS pilot symbol waveform bursts (120) according to a scheme that is known by the receiver (e.g. the receiver processor 104*p* and receiver memory 104*m*), the task of any receiver processor(s) (104*p*) and memory (104*m*) to determine the 2D channel impulse responses and the 2D channel state is greatly simplified.

Note that in the simplified example shown in FIG. 1B, the transmitter (102) has only one antenna, and the receiver (104) has only one antenna. As will be discussed later in this specification, this is not always the case.

In some embodiments, the transmitter circuitry (102*c*) may be configured to transmit multiple grids (102*g*) of OTFS symbols using multiple transmitter antennas, sometimes at different polarizations, and sometimes also adjusting the direction and/or phase of the waveforms across multiple antennas. These embodiments will also be discussed in further depth shortly.

Similarly in some embodiments, the receiver circuitry (104*c*) may be configured to receive signals using multiple receiver antennas. The receiver circuitry may also be configured (in conjunction with these multiple receiver antennas to detect the polarization, direction or phase of the incoming waveforms as well. Thus in these more complex schemes, the receiver may also be simultaneously receiving more than one bin (104*b*) of OTFS symbols at the same time as well.

Note further that because, according to OTFS methods, OTFS symbols are transmitted using mutually orthogonal waveforms, in some embodiments, it may be useful to configure the receiver circuitry (104*c*) to be able to detect data channel caused projection of a first OTFS symbol transmitted using a first OTFS waveform onto a second OTFS symbol transmitted according to a second OTFS waveform because the two waveforms are mutually orthogonal to each other.

Note that in FIG. 1B, although examples of two dimensional transmitter OTFS grids (102*g*) and receiver OTFS bins (104*b*) are shown, this represents just the simplest embodiment. In other embodiments, to be discussed, the OTFS transmitter grid (102*g*) and/or the receiver OTFS bins (104*b*) can also have optional additional dimensions in addition to the time and frequency dimensions shown in the illustration. Examples of such optional additional dimensions include polarization dimensions, phase dimensions, angle of transmission or reception direction, and mixtures of the orthogonality of the received OTFS waveforms dimensions.

As can be seen in FIG. 1A, upon propagation through the impaired data channel (100), the direct OTFS pilot bursts then travel over at least one path. These paths can include direct OTFS pilot bursts traveling directly from the transmitter to the receiver (112); and replica OTFS pilot bursts. These replica OTFS pilot bursts are typically direct OTFS pilot bursts (114a, 114b) that have reflected off of at least one reflector (106) before reaching the receiver. As a result, what were originally direct OTFS waveform bursts (112) have now been further reflector time-delayed (because they have had to travel a longer distance) and also reflector frequency-shifted (assuming that the reflector may be moving) by the time these replica OTFS pilot bursts (114b) reach the receiver (104).

As a result, by the time that the direct (112) and replica (114b) OTFS pilot (waveform) bursts reach the receiver, constructive and destructive interference will occur. For example, even the direct OTFS pilot bursts (112) may be both time delayed (due to the distance between the transmitter and receiver) and also frequency shifted (because the transmitter and receiver may not be precisely accurate, or because the transmitter and receiver may be moving with respect to each other, or other effects). Thus the resulting combination of any transmitter frequency shifted and receiver frequency shifted direct OTFS pilot bursts (112), when combined with the various replica OTFS pilot (114b) bursts, will produce channel-convoluted OTFS pilot bursts.

So in essence the data channel (100) has scrambled or convoluted the original OTFS pilot bursts to an unknown extent. Here, according to the invention's methods, however, at the receiver (104), the method will use the receiver's bin structure (104b) to receive these channel-convoluted OTFS pilot bursts, and the method will use at least one processor (typically the receiver processor 104p and memory 104m) to determine (often essentially in real time) the 2D channel state of the impaired data channel (100) that connects the transmitter(s) and receiver(s).

Figure 1C:
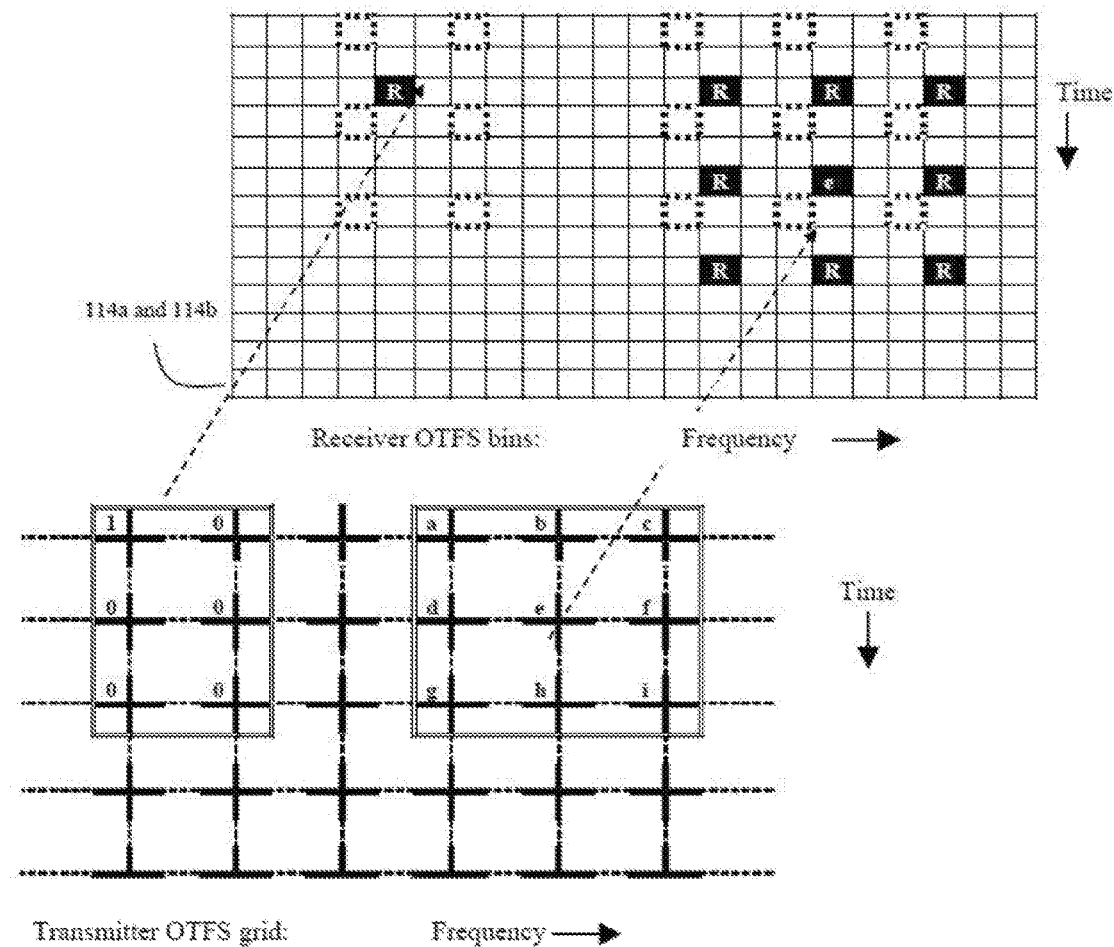
FIG. 1C shows how the replica OTFS waveform bursts (e.g. bursts that bounce off of reflectors, such as the moving reflector shown here), are received by the receiver according to the receiver's oversampled bin structure or lattice. Here all OTFS waveform bursts are displaced both in time (due to the distance traveled) and frequency (due to Doppler effects).

FIG. 1C shows how the replica OTFS waveform bursts (114a), bouncing off of the reflector (106) which is moving at a certain velocity (108), are received by the receiver (104) according to the receiver's bin structure (104b). Here the OTFS waveform bursts (114b) are displaced in both time (due to the distance traveled along 114a and 114b) and frequency (due to Doppler effects due to the reflector velocity 108).

Figure 1D:
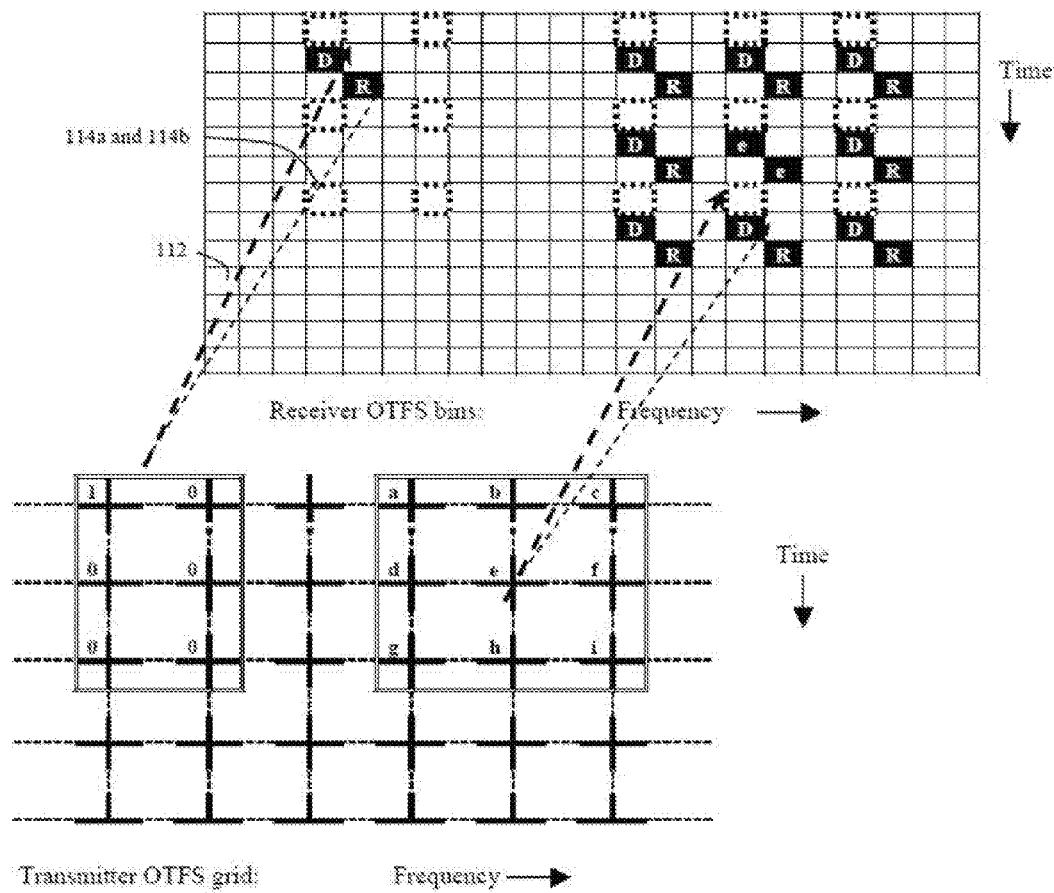
FIG. 1D shows how the channel-convoluted OTFS waveform bursts (sum of the direct bursts and the replica bursts) are received by the receiver according to the receiver's oversampled bin structure or lattice.

FIG. 1D shows how the channel-convoluted OTFS waveform bursts (sum of the direct bursts 112 from FIG. 1B, and the replica bursts 114a and 114b from FIG. 1C) are received by the receiver (104) according to the receiver bin structure (104b). The receiver is now receiving a more complex mix of signals, but the same methods used to deconvolute the OTFS pilot symbol waveform bursts (120) will also work to deconvolute the OTFS data symbol waveform bursts as well (130). Note that in a real world situation, there typically will be many reflectors operating, some moving some not. Additionally there may be more than one transmitter and receiver (some moving, some not) and also, as will be discussed, the transmitters and receivers ma have multiple antennas. Thus in the real world, there will be a very complex set of channel convoluted OTFS waveform bursts at the receiver(s) (104).

In some embodiments, the 2D channel state can be represented by a matrix or other mathematical transform that describes, for the impaired data channel, how some or all signals transmitted by the transmitter are coupled with some or all signals from the transmitter that are received by the receiver.

Before going into the various details of how the processor (usually receiver processor(s) 104p) can take the raw data obtained from the receiver bin structure (104b), and transform this raw data into 2D channel state information, it is important to spend a bit more time discussing how OTFS pilot symbols (120), the transmitter OTFS time-frequency grid (102g), and the receiver OTFS time frequency bins (104b) are chosen.

In general, choice of grid structure (102b), bin structure (104b), and OTFS pilot symbols (e.g. 120, 122) should be motivated by practical considerations regarding the data channel (100), reflector spacing or positions (106) relative to the positions of the transmitter(s) and receiver(s), and expected data channel frequency shifts. The main goal is that the scheme (e.g. transmitter OTFS grid structure 102g, receiver bin structure 104b) should capture at least some of the underlying details of this expected reflector spacing and expected frequency shifts.

Thus the speeds of waveform propagation through the data channel, waveform wavelengths, and for wireless data channels, considerations such as likely speeds of the transmitters, receivers, and reflectors (which cause Doppler frequency shifts) are all valid considerations. A grid or bin structure that for example, extends too narrowly (insufficiently) in frequency or too short (insufficiently) in time to capture important details of the 2D channel structure may be suboptimum or even useless.

Similarly a grid or bin structure that is too coarse (e.g. spacing too big) so that important details of the 2D channel structure are missed (e.g. all received signals end up in one receiver bin) will again be suboptimum or even useless.

Typically the system will make these selections prior to transmission, generally according to the underlying physics of the data channel, but also according to any regulatory constraints or commercial constraints as needed. Thus regulations may place limits on allowable frequency ranges and allowable transmitter powers, for example. Commercial constraints, such as latency time considerations, may also place constraints on extent to which the grid extends in time as well.

More specifically, prior to transmission, the plurality of OTFS pilot symbols $P_{pt,pf}$ (120) transmitter two dimensional pilot OTFS time-frequency grid structure (102g), and receiver two dimensional pilot OTFS time-frequency bin structure (104b) should be chosen to usefully capture details of the data channel. This choice should be such, for example, that if, after transmission by the transmitter(s), the impaired data channel subsequently causes at least some of the OTFS pilot symbol waveform bursts $P_{t1,f1} \cdot W_p(t1, f1)$ originally transmitted at a first time-frequency (transmitter grid) coordinate to be projected onto different OTFS pilot symbol waveform bursts $P_{t2,f2} \cdot W_p(t2, f2)$ originally transmitted at a different time-frequency (transmitter grid) coordinate, these effects can be detected by the receiver. Specifically the receiver bin structure and receiver receiving circuitry should be such that when these projections occur, and OTFS pilot symbol waveform bursts are projected into different bins (e.g. bins with a time and frequency different from those nominally corresponding to the original OTFS pilot symbol waveform bursts $P_{t1,f1} \cdot W_p(t1, f1)$), at least some of these projections will be detectable and quantifiable by the receiver(s). Here, for example, standards can be set up, and/or the transmitter and receiver software (which may also be stored in memory such as 102m, 104m) designed to ensure that the grid structure and the bin structure are set up appropriately the data channel at hand.

Returning to the issue of how the processor (often the receiver processor 104p) can take the raw data obtained from the receiver bin structure (104b), and transform this raw data into 2D channel state information—here various methods may be used. Often these will be software implemented methods that may be implemented using the receiver processor(s) (104p) and associated memory (104m), but other methods, such as more specific hardware methods, may also be used.

In one scheme, the 2D channel state can be at least partially determined by using at least one 2D impulse response to mathematically describe how the impaired data channel (100) causes at least some of the OTFS pilot symbol waveform bursts $P_{t1,f1} \cdot W_p(t1, f1)$ transmitted at a first time-frequency coordinate to be projected onto either different OTFS pilot symbol waveform bursts $P_{t2,f2} \cdot W_p(t2, f2)$ originally transmitted at a different time-frequency coordinate, and/or and receiver bins (104b) different from those nominally corresponding to the OTFS pilot symbol waveform bursts $P_{t1,f1} \cdot W_p(t1, f1)$.

Here, for example, the method may further use a plurality of these 2D impulse responses from a plurality of receiver bins to at least partially describe the 2D channel state as a 2D Z-transform or other type of 2D transform. Such Z-transforms are described by Oppenheim et. al., in chapter 3 of "Discrete-Time Signal Processing, Second Edition, Prentice Hall, 1999, and elsewhere.

In this scheme, the 2D channel state can be viewed as a type of blurring function which in effect blurs the originally "sharp" signals transmitted by the transmitter according to individual specific coordinates on the transmitter OTFS grid (102g) and smears these signals over multiple receiver bins (104b), as is illustrated in simplified form by FIG. 1D. Here, once the smearing of a known signal (here the pilot signals) are characterized, then the same transforms used to deconvolute the pilot symbols should also work to deconvolute the data symbols as well.

Although in some embodiments, as few as one OTFS pilot symbol waveform with non-zero energy (surrounded by appropriate null or zero-energy spaces in the appropriate OTFS transmitter grid structure such as is shown in 120) may be transmitted; in other embodiments a substantial number of non-zero energy OTFS pilot symbol waveforms may be transmitted.

Transmitting a plurality of non-zero energy OTFS pilot symbol waveforms can have the advantage of enabling the 2D channel state of the data channel to be established at a still higher degree of accuracy. However the costs of this later approach may be that the amount of OTFS data or legacy data (if any) transmitted at the same time may be reduced. For example, if the amount of space on the transmitter grid (102g) used to transmit OTFS pilot symbols (120) increases, then at some point the amount of space on the transmitter grid (102g) used to transmit OTFS data symbols (130) will by necessity be decreased because the transmitter grid (102g) is not of infinite size in either time or frequency. OTFS data symbols can still be transmitted in this case, but according to a subsequent data carrying grid frame, which can increase latency.

There are additional considerations as well. For example, the OTFS pilot symbols should ideally be chosen to make the subsequent determination of the 2D channel state by the receiver relatively unambiguous, and preferably also chosen to reduce the computational loads on the receiver processor(s) (104p) as well. As before, typically the plurality of OTFS pilot symbols $P_{pt,pf}$ and their OTFS grid locations will be chosen according to a common scheme understood by both the transmitter and the receiver so that the receiver processor (104p) clearly recognizes which bin locations (104b) represent channel convoluted pilot symbols.

Various schemes may be used here. In some embodiments, the plurality of OTFS pilot symbols may be one or two dimensional m-sequences (or partial m-sequences) comprising binary maximal-length shift register sequences, delta values $P_{i,j}$ surrounded by regions of Ppt,pf zero values. Such sequences are described by Xiang, "*Using M-sequences for determining the impulse responses of LTI-systems*", Signal Processing 28 (1992), pages 139-152. Alternatively other pilot symbol schemes, such as one or two dimensional Barker codes, Costas arrays, Walsh matrixes, and the like may also be used. Here again the criteria are that this plurality of pilot symbols should be selected to facilitate acquisition (e.g. characterization) of the 2D channel state of the data channel. As before, the receiver bin structure (104b) should generally be chosen so that the various receiver OTFS time-frequency bins will have time-frequency resolutions that are equal to or more precise than the time-frequency resolutions of the OTFS transmitter grid (102g).

Transmitting Data:

Of course the 2D channel state of a data channel, in and of itself, is generally of little use unless it is then subsequently used to help facilitate data transmissions. The pilot methods described herein can produce 2D channel state information that can be useful for transmitting either legacy data (that is, data formatted according to essentially any prior-art non-OTFS methodology), or for data transmitted by OTFS methods as well.

Although in some embodiments, any data transmission can be timed to occur either before or after the 2D channel state of the data channel is determined by the methods described herein (for example, transmitting a first OTFS grid (102g) frame with nothing but data symbols, followed by either legacy data transmissions, or transmissions of a second OTFS grid frame with data symbols), in some embodiments, it will be useful to transmit data (by either legacy or OTFS methods) along with the OTFS pilot (waveform) bursts.

In this scheme, the system will generally also use the transmitter (102) and at least one processor (usually a transmitter processor 102p) to transmit a plurality of data symbols through the impaired data channel (100). This plurality of data symbols will itself typically be transmitted as direct data bursts comprising a plurality of data carrying waveform bursts. These direct data (waveform) bursts may be transmitted along with the direct OTFS pilot bursts to the receiver(s). These direct data bursts will also be reflected off the reflector(s) (e.g. 106), also producing replica data bursts. These replica data (waveform) bursts will, as before, comprise time-delayed and reflector frequency-shifted direct data bursts. When the direct and replica data bursts reach the receiver(s), constructive and destructive interference will again occur. As before, these direct data bursts may also be subject to transmitter frequency shifting or receiver frequency shifting caused by imperfections in the transmitters or receivers, motion of the transmitters and receivers, and the like). At the receiver(s), the resulting combination of any these direct data bursts (which may be transmitter frequency shifted and receiver frequency shifted), and replica data bursts will produce channel-convoluted data bursts.

If a large amount of complex and unknown data symbols were transmitted, and absent any 2D channel state information obtained from the OTFS pilot bursts, the receiver processor might encounter great difficulty in deconvoluting these channel-convoluted data bursts. However according to the methods described herein, the receiver can take advantage of this 2D channel state information, and use at least one processor (usually a receiver processor 104p and memory 104m) to deconvolute at least some of the various channel-convoluted data bursts. This allows the receiver to derive at least an approximation of the originally transmitted plurality of data symbols.

Alternatively or additionally, the receiver can also send commands back to the transmitter. (Here assume that the receiver has its own transmitter, and the transmitter in turn has its own receiver). These commands, which can be based on the 2D channel state obtained by the receiver, or indeed can be a copy of some or all of the 2D channel state obtained by the receiver, can then be used by the transmitter(s) processors (102p) and associated memory (102m) to precode at least some of the direct data bursts to pre-compensate for the impaired data channel. Thus for example, if the impaired data channel (100) induces a particular distortion, the transmitted signal can be adjusted with an anti-distortion factor such that by the time the precoded signal reaches the receiver, the anti-distortion factor cancels out the distortion caused by impaired data channel, thus resulting in a relatively clean and undistorted signal at the receiver.

Although the methods described herein can be used to help improve the efficiency of transmitting even legacy (prior art) data according to legacy methods (here Morse code on the original 1858 transatlantic cable is being used as an extreme example to emphasize this point), the 2D channel state characterization methods used herein can be most useful when used in conjunction with data that is also being transmitted by OTFS methods. These OTFS data transmission methods are further described below.

In a preferred embodiment, the direct data bursts will transmit at least some of the plurality of data symbols as direct OTFS data bursts. These direct OTFS data bursts will generally comprise a plurality of OTFS data symbols $D_{dt,df}$ transmitted as OTFS data symbol waveform bursts $D_{dt,df} \cdot W_d$ (dt, df) over a plurality of combinations of times dt and frequencies df. Here dt and df are unique data time-frequency coordinates (dt, df) chosen from a two dimensional OTFS data time-frequency grid (or communications lattice), such as (130). Generally all of the OTFS data symbol waveform bursts $D_{dt,df} \cdot W_d$ (dt,df) will comprise originally transmitted OTFS data symbols $D_{dt,df}$ transmitted by mutually orthogonal waveform bursts derived from cyclically time and frequency shifted versions of a same OTFS data basis waveform Wd. As per previous OTFS discussions, each data bit (and data symbol which may be formed from multiple data bits) is distributed over this plurality of OTFS data symbols $D_{dt,df}$. These OTFS data bursts travel thorough the data channel as direct OTFS data bursts and replica OTFS data bursts as described previously. At the receiver(s), they constructively and destructively combine, producing channel-convoluted data bursts. Here these are called channel-convoluted OTFS data bursts.

According to this joint OTFS pilot symbol OTFS data symbol transmission scheme, the individual data symbols in the plurality of data symbols are encoded into a plurality of OTFS data symbols Ddt,df at the transmitter prior to transmission, often using the transmitter processor(s) (102p) and memory (102m). As per other OTFS data transmission methods, the OTFS data encoding is such that the receiver must successfully receive a plurality of OTFS data symbols $D_{dt,df}$ to provide enough information to determine any of the individual data symbols.

As per other OTFS data transmission schemes, the plurality of OTFS data symbol waveform bursts $D_{dt,df} \cdot W_d$ (dt, df) are each are mutually orthogonal waveform bursts derived from a same OTFS data basis waveform $W_d$. At the receiver, the receiver bin structure (104b) is such that in addition to encompassing any OTFS pilot symbols (e.g. 120), the bin structure (104b) further encompasses the two dimensional OTFS data time-frequency grid (e.g. 130) as well. Put in yet another way, the extent of the receiver bin structure (104b) in time and frequency, and the resolution of the individual receiver bins, will at least match and preferably exceed the extent of the transmitter grid structure (102g) in time and frequency, as well as resolution.

In some embodiments, it will be useful to ensure that the OTFS pilot symbol waveform bursts and OTFS data symbol waveform bursts are transmitted and received in a highly coordinated manner. To do this, here as per FIG. 1B, the OTFS data symbol waveform bursts $D_{dt,df} \cdot W_d$(dt, df) (130) and the plurality of OTFS pilot symbol waveform bursts $P_{pt,pf} \cdot W_p$(pt, pf) (120) should be chosen from a common plurality of times t and frequencies f, where each of the t and f are unique time-frequency coordinates (t, f) chosen from a common grid of two dimensional OTFS time-frequency coordinates (102g). According to this coordinated OTFS pilot and data transmission scheme, the time-frequency coordinates (td, fd) for the individual OTFS data symbol waveform bursts should preferably be further chosen as to not overlap with the time-frequency coordinates (pt, pf) for the OTFS pilot symbol waveform bursts. Here of course, overlapping is undesirable as it can cause confusion between the OTFS pilot symbols used to determine or acquire the 2D channel state, and OTFS data symbols used to transmit data.

Note however that there is no requirement that all possible coordinates on the OTFS data time-frequency grid be filled with OTFS pilot symbols and data symbols. For example, even as shown in FIG. 1B, there can be some unused grid coordinates.

Indeed in some embodiments the OTFS data time-frequency grid may only be sparsely occupied with OTFS pilot symbols and data symbols. Thus in general, the OTFS data OTFS data symbol waveform bursts $D_{dt,df} \cdot W_d$(dt,df) and the plurality of OTFS pilot symbols $P_{pt,pf}$ transmitted as OTFS pilot symbol waveform bursts $P_{pt,pf} \cdot W_p$(pt, pf) do not need to occupy all unique time-frequency coordinates (dt, df) chosen from the two dimensional OTFS data time-frequency grid.

Note also that there is no requirement that all positive energy OTFS data symbol waveform bursts (here the "1" (122) in FIG. 1B) or pilot symbols be transmitted at the same energy or power level. Instead in some embodiments, the plurality of OTFS data symbol waveform bursts $D_{dt,df} \cdot W_d$ (dt,df) and the plurality of OTFS pilot symbols $P_{pt,pf}$ transmitted as OTFS pilot symbol waveform bursts $P_{pt,pf} \cdot W_p$(pt, pf) may be transmitted at different power levels. Here, for example, some OTFS data symbol waveform bursts or some OTFS pilot symbol waveform bursts can be sent at power levels chosen according various criteria such as the 2D channel state, the distance from a given transmitter to a given receiver, sensitivity of a given receiver, and the like.

When both OTFS pilot symbols and OTFS data symbols are transmitted according to the same transmitter OTFS time and frequency grid (102g), and according to the same basis waveform (e.g. wherein the OTFS pilot basis waveform $W_p$ and the OTFS data basis waveform $W_d$ are chosen to be the same basis waveform), the topology or arrangement of which grid coordinates are used for OTFS pilot symbols, and which grid coordinates are used for OTFS data symbols, can vary. Although in FIG. 1B, the OTFS pilot symbols (120) were shown occupying a different (adjacent) portion of the transmitter OTFS grid (102g) from the OTFS data symbols (130), this need not always be the case.

Figure 8:
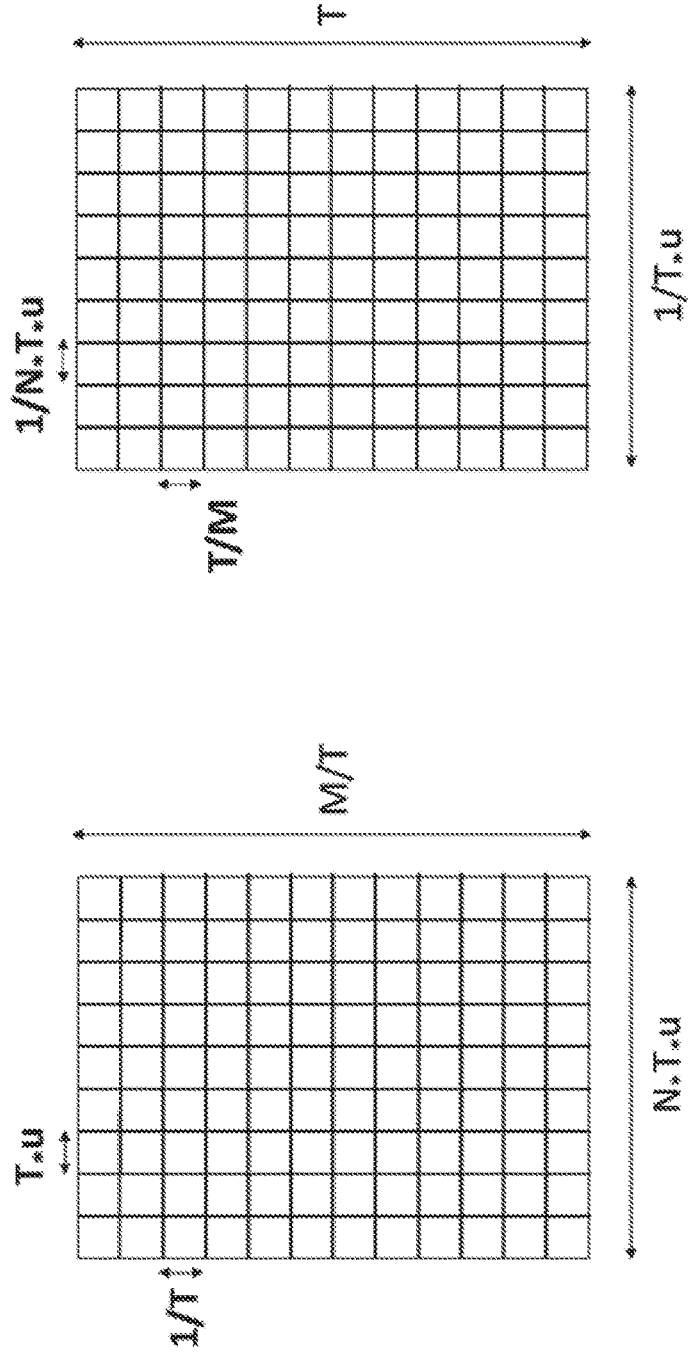
FIG. 8 shows a more detailed diagram showing the image domain and transform domain that may be used for the symplectic OTFS methods described herein.
Figure 9:
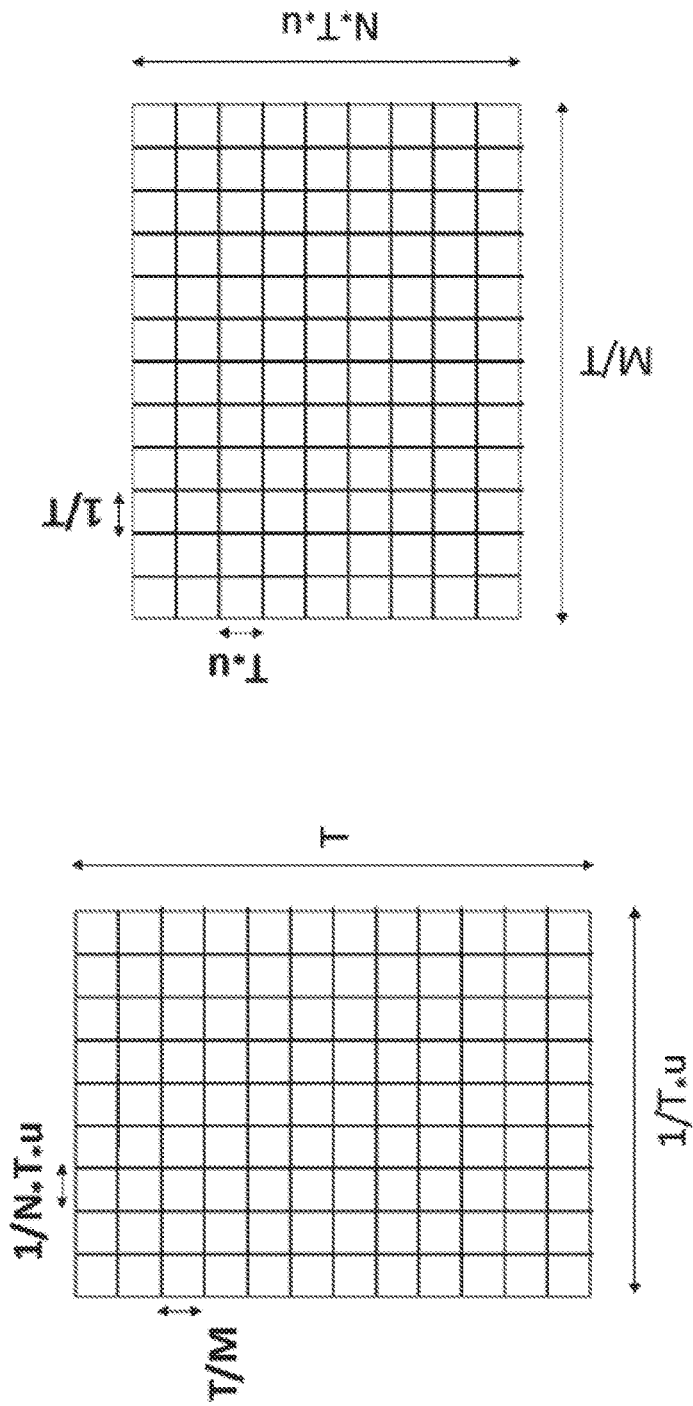
FIG. 9 shows another perspective on the image domain and transform domain dual grids that may be used for the symplectic OTFS methods described herein.
Figure 12:
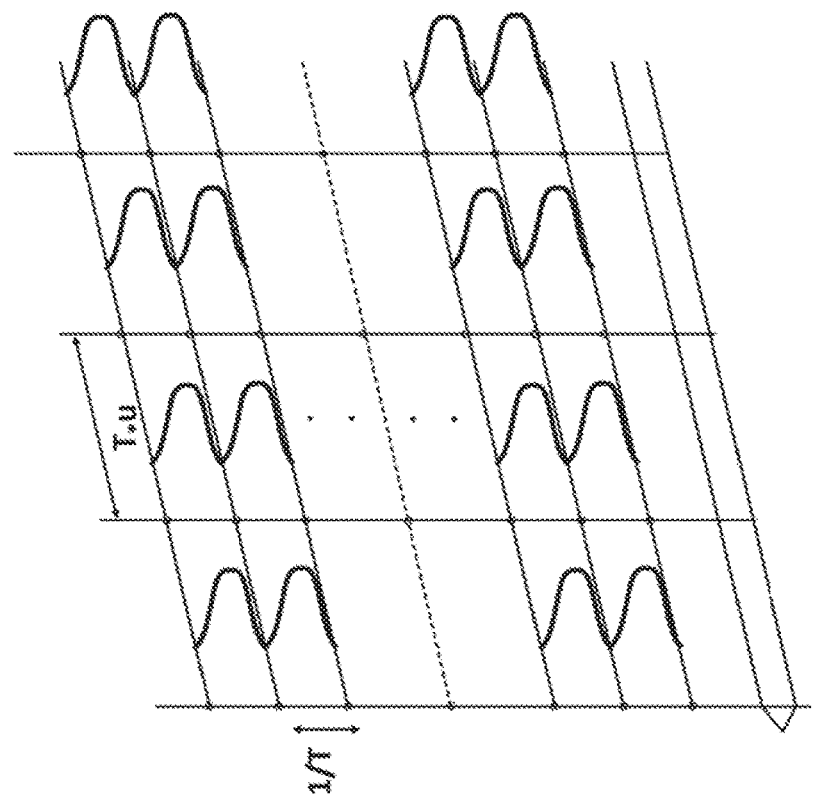
FIG. 12 shows another version of FIG. 5.
Figure 11:
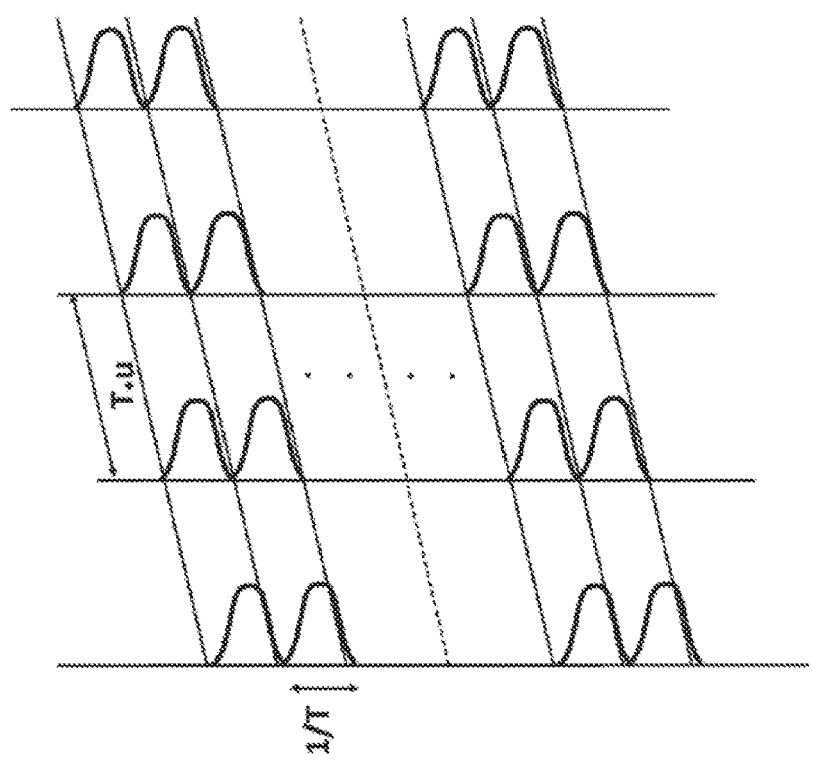
FIG. 11 shows another version of FIG. 5.

FIG. 8 shows a more detailed diagram showing the image domain and transform domain that may be used for the symplectic OTFS methods described herein.

Figure 13:
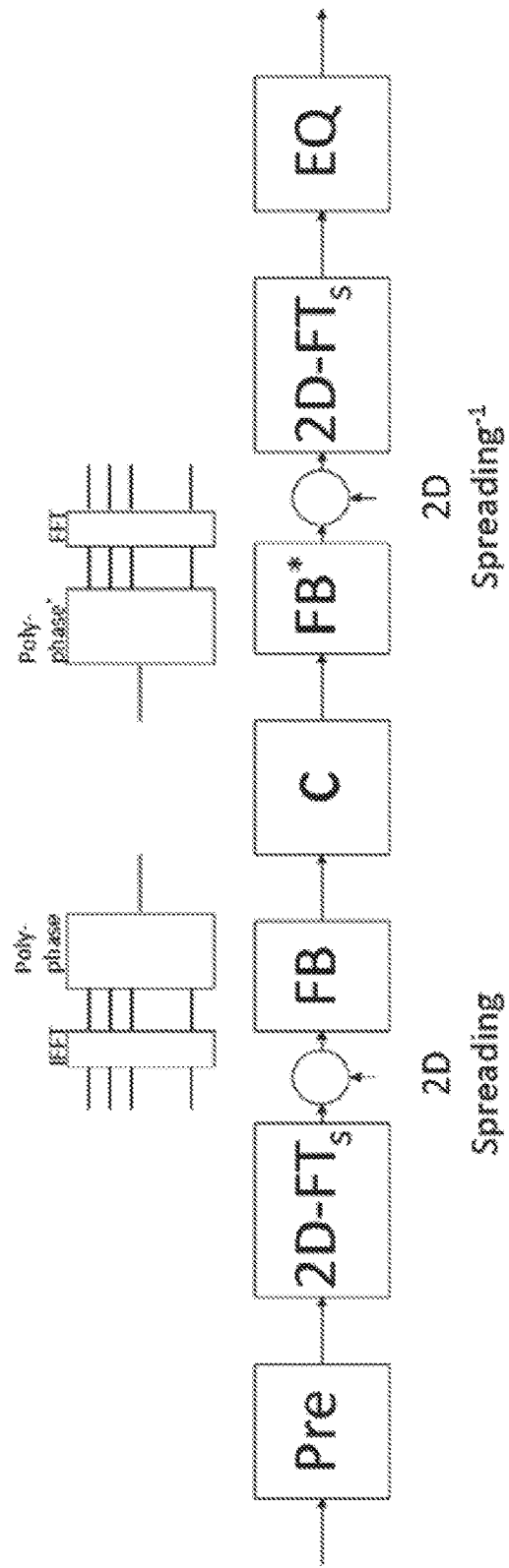
FIG. 13 shows how the symplectic OTFS methods can operate in a transmitter and receiver system. Here the data on the information plane (which may be optionally subjected to predistortion) may be then subjected to an inverse 2D Fourier Transform (and also usually a 2D spreading function) before passing through a filter bank (which may be an OFDM compatible filter bank). The various waveforms pass through the channel C, where they are received by a filter bank (which may be an OFDM compatible filter bank), subjected to an inverse spreading function, inverse 2D Fourier Transform (inverse of the previous IFFT), and then Equalized as needed.

FIG. 13 shows how the symplectic OTFS methods can operate in a transmitter and receiver system. Here the data on the information plane (which may be optionally subjected to predistortion) may be then subjected to an inverse 2D Fourier Transform (and also usually a 2D spreading function) before passing through a filter bank (which may be an OFDM compatible filter bank). The various waveforms pass through the channel C, where they are received by a filter bank (which may be an OFDM compatible filter bank), subjected to an inverse spreading function, inverse 2D Fourier Transform (inverse of the previous IFFT), and then Equalized as needed.

Figure 14:
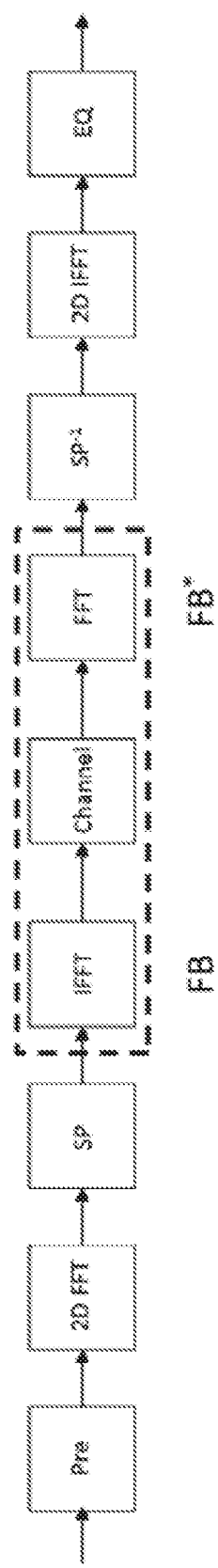
FIG. 14 shows an alternative method of transmitting and receiving data over a channel.

FIG. 14 shows an alternative method of transmitting and receiving data over a channel.

FIG. 19 shows an example of how an active OTFS relay system may operate between an OTFS transmitter and receiver.

Use with Alternative Forms of Communication

Note that although wireless examples have been used throughout this disclosure, these examples are not intended to be limiting. In alternative embodiments, other medium, such as electrical transmission or RF transmission over wires or cable, optical transmission over optical fibers, and other long distance communication methodology, including acoustic transmission of signals over air or water or solid material, is also contemplated.

Effects of Channel Interference:

According to the symplectic OTFS schemes discussed herein, in the symplectic coordinate systems, channel interference such as Doppler effects will distort or transform the symplectic plane along the frequency axis as a function according to the frequency shift due to Doppler effects, while channel interference such as time delays will distort or transform the symplectic plane along the time axis as a function according to the speed of light time delays. The net effect is that on the symplectic OTFS coordinate system, channel interference time delays shows up as phase gradients in one axis, while Doppler shifts show up as amplitude modulation effects along the other axis.

Because symplectic OTFS methods transmit in the transformed domain, channel convolutions are much easier to deal with, because channel convolutions show up as multiplication functions, which are easier to handle. Here the trick is simply to sample the signals finely enough in time and frequency so as to be able to detect these channel distortion caused phase gradients and amplitude modulation effects. Once these can be detected, they can be corrected for and eliminated.

This helps solve a long felt problem in the area. There was a lack of awareness in the field as to how to correct for channel distortions such as Doppler shifts and time delays using prior art OFDM methods. The belief was that because OFDM methods relied on sending information across a plurality of relatively narrow bandwidth bands, it was infeasible to correct for such channel distortions. However in fact, with appropriate sampling intervals to detect channel distortion caused phase gradients and amplitude modulation in the OFDM signals, in fact such corrections are possible.

Figure 15:
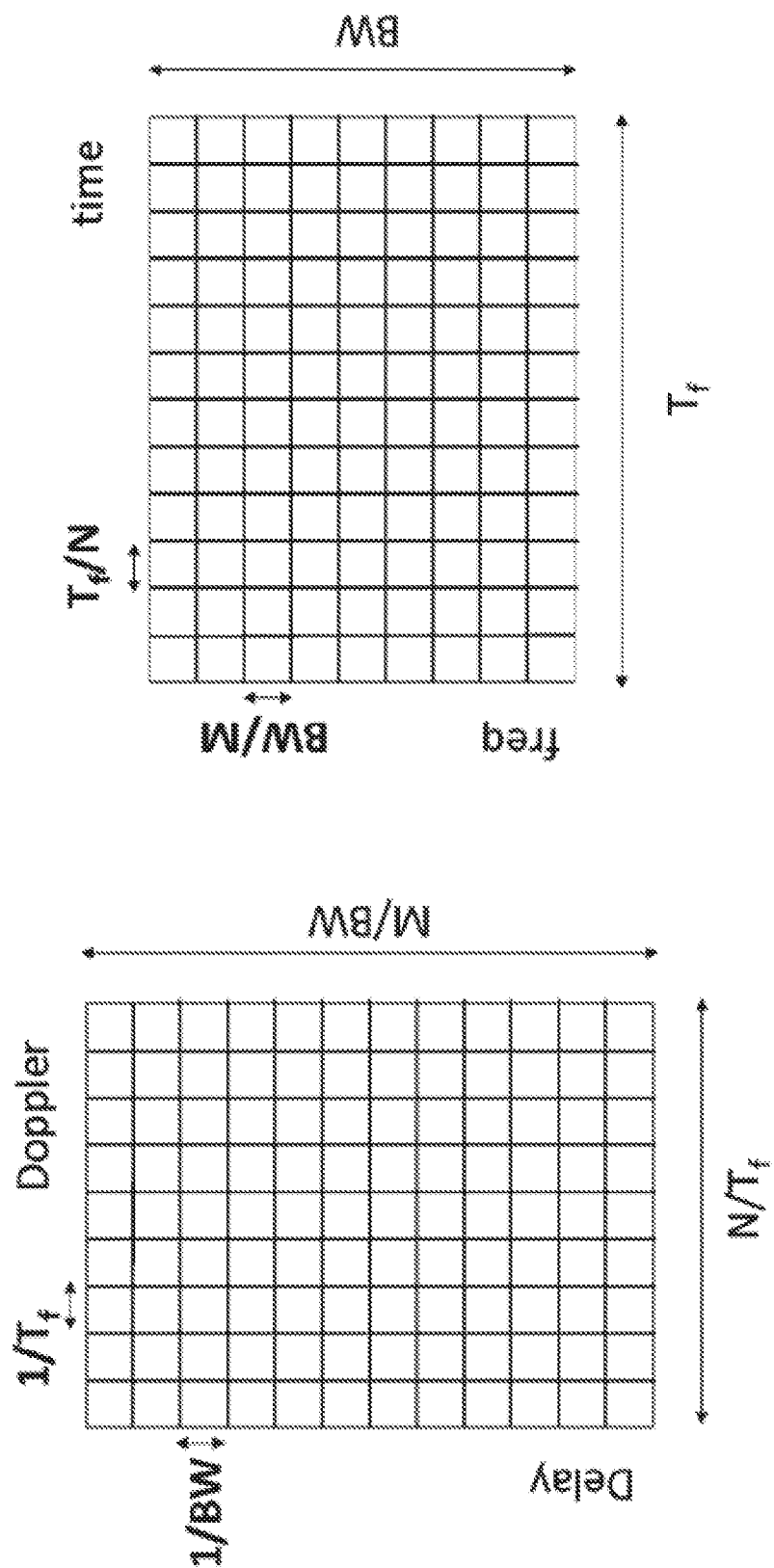
FIG. 15 shows the impact of channel caused Doppler and time delays on the image domain and transform domain dual grids.

FIG. 15 shows the impact of channel caused Doppler and time delays on the image domain and transform domain dual grids.

Interleaving, and Compatibility with Legacy OFDM Methods

It is possible to interleave different information planes using symplectic methods. One very useful aspect of the symplectic version of OTFS is that in some embodiments the symplectic OTFS filter banks can be set up to, for example, be compatible with previous OFDM standards such as the popular cellular 4G standards. At the same time, previous OFDM standards, such as 4G, also have medium access control (MAC) protocols that allow for control over timing and interleaving.

Here one example of interleaving is for example, only sending a certain column time width of the entire symplectic field over a range of frequency bands during a first time interval, sending something else, and then sending another column time width of the entire symplectic field over a range of frequency bands over a later time interval. Other forms of interleaving, such as interleaving on a frequency basis, are also possible.

Figure 16:
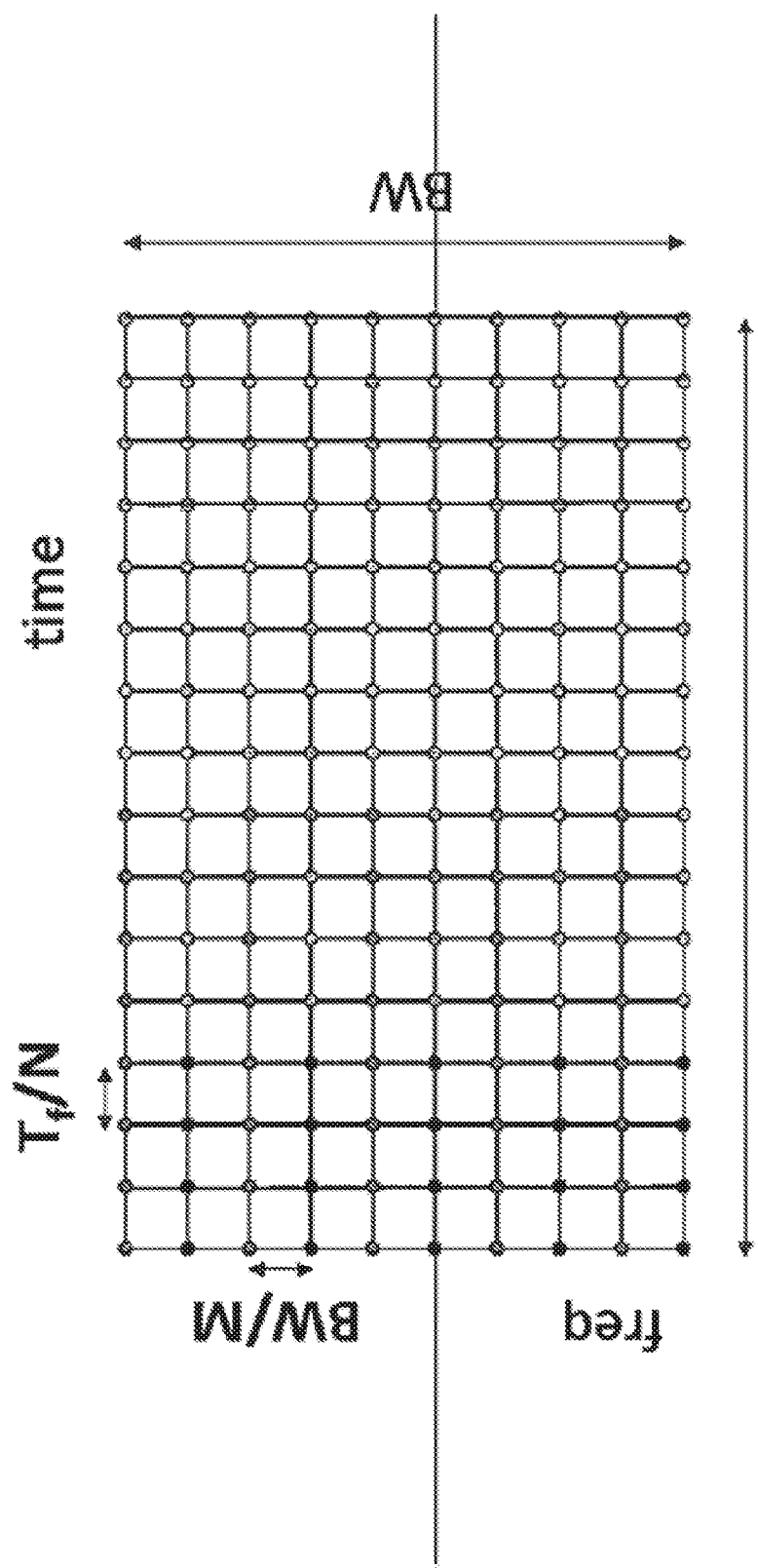
FIG. 16 shows one example of interleaving.

FIG. 16 shows one example of interleaving.

Figure 17:
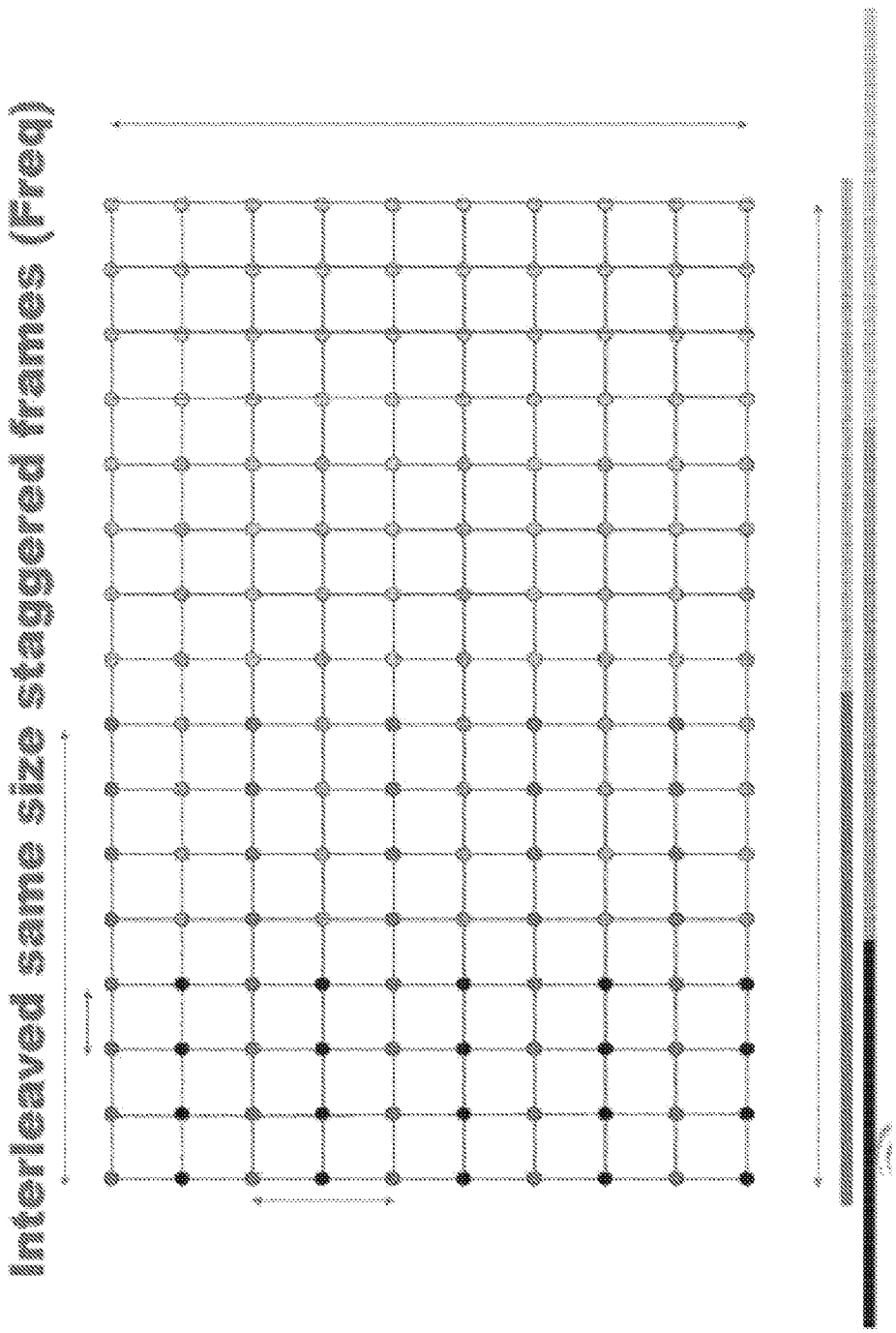
FIG. 17 shows another example of interleaving, in which same size frames are interleaved on a frequency staggered basis.

FIG. 17 shows another example of interleaving, in which same size frames are interleaved on a frequency staggered basis.

Figure 18:
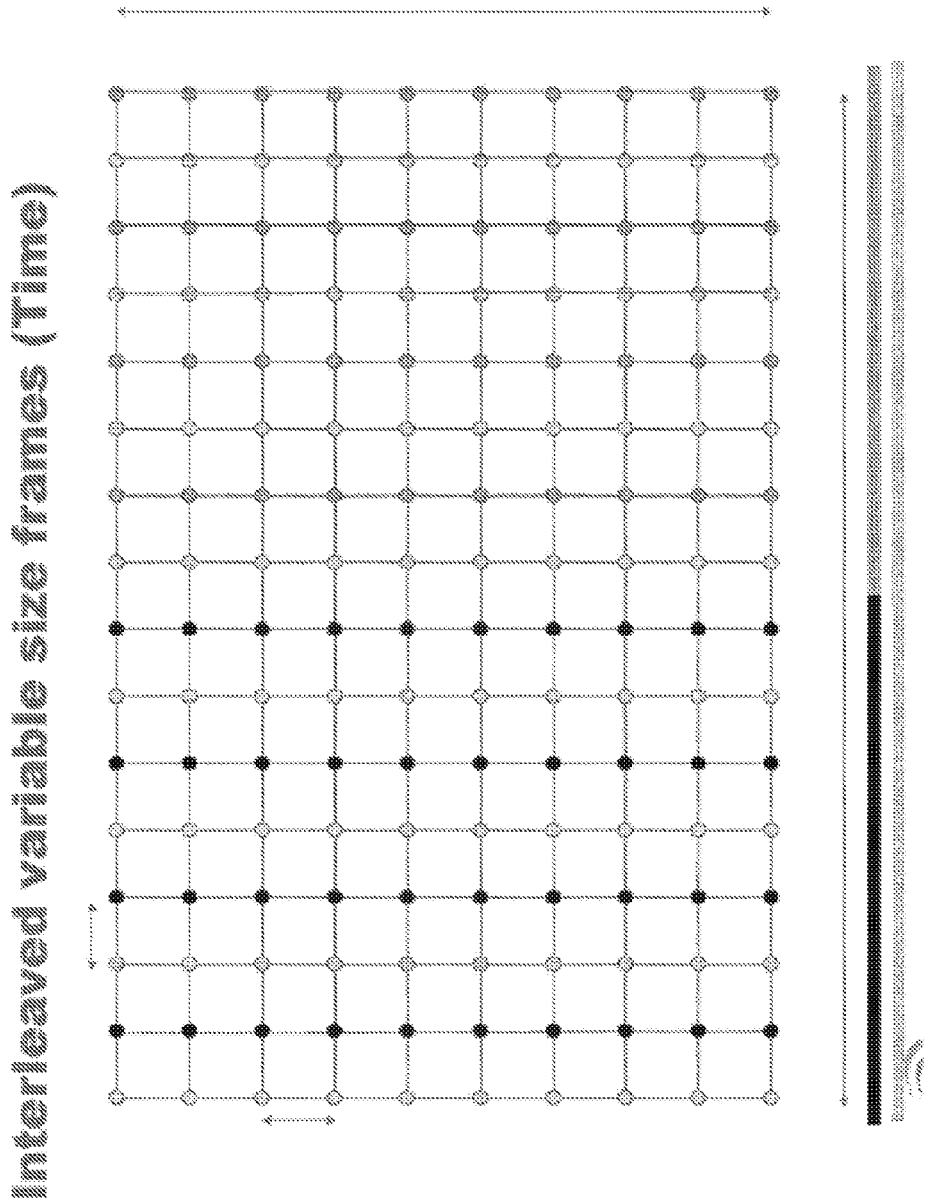
FIG. 18 shows another example of interleaving, in which variable size frames are interleaved on a time basis.

FIG. 18 shows another example of interleaving, in which variable size frames are interleaved on a time basis.

Backward Compatibility with OFDM Methods

In some commercially important embodiments, symplectic OFDM methods can both co-exist with legacy OFDM methods on the same frequencies and times, and indeed may even be used to improve the efficiency of legacy OFDM methods.

In this embodiment, symplectic OTFS methods may be viewed as feeding signals to an OFDM modulator. With interleaving, this same OFTM modulator may be driven using legacy OFDM symbols during some time intervals, and OTFS signals during other time intervals. In this regard, symplectic OTFS methods may be viewed as being (on the transmitting side) an improved front-end for OFDM modulators. Here, for example OTFS transceivers may be viewed as comprising signal pre-processing prior to the OFDM modulator for transmission, and signal post-processing after the OFDM receiver at the receiving end.

Thus in this approach, the best of both worlds may be possible. Compatibility with popular legacy OFDM methods such as 4G may be preserved, at least when needed, while at the same time, the superior ability of OTFS methods to correct for channel distortion can also be enjoyed on an essentially simultaneous basis. This makes for an easy transition from, for example a legacy 4G system to a new higher capability "5G" system based on the OTFS methods described herein and elsewhere.

Figure 20:
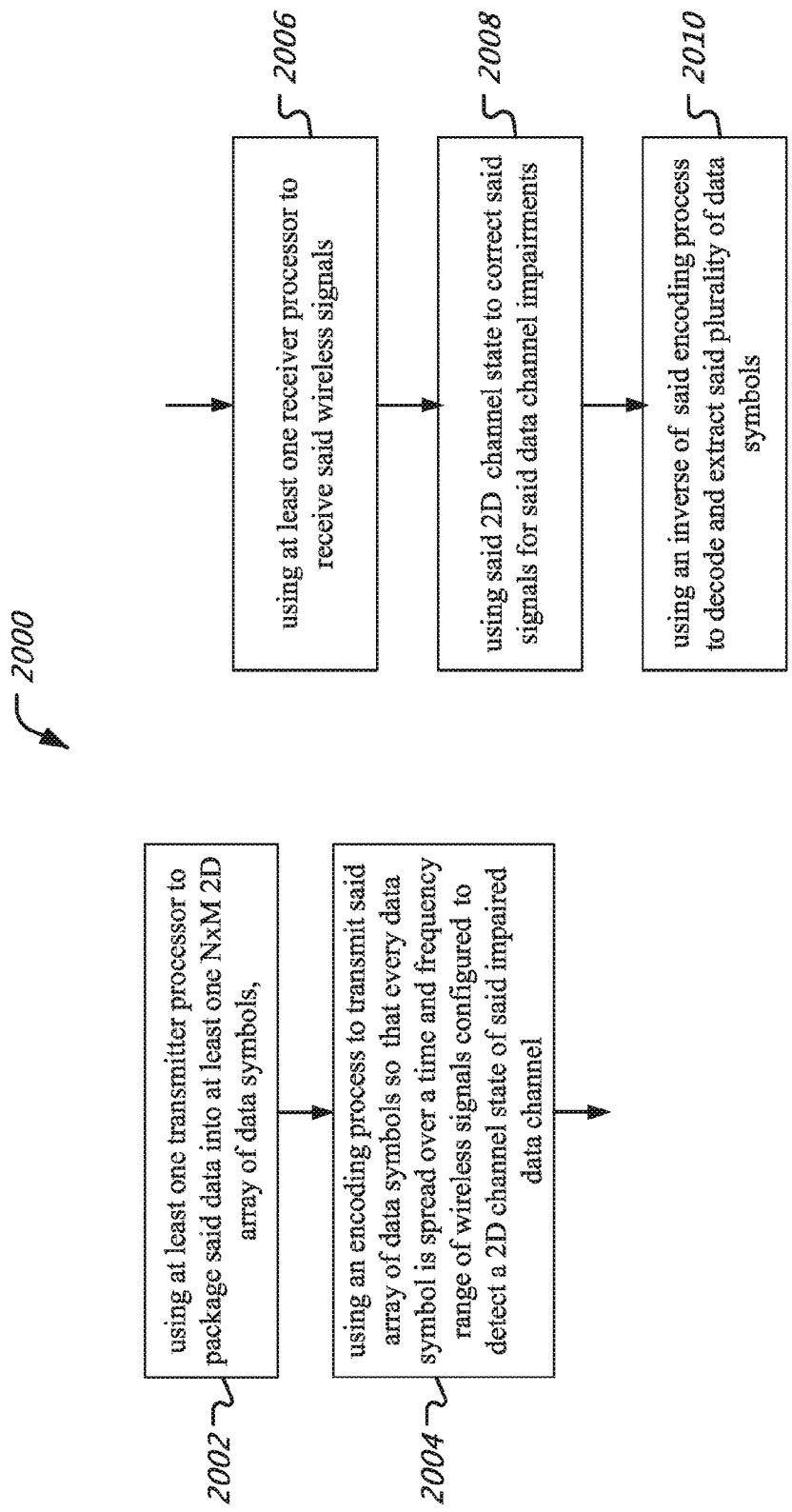
FIG. 20 is a flowchart depiction of an example of a wireless communication method.

FIG. 20 is a flowchart of a method 2000 of wireless communication for wirelessly transmitting and receiving data over an impaired data channel coupling at least one wireless transmitter and at least one wireless receiver, said data comprising a plurality of data symbols. The impaired data channel impairs said waveforms, said impairment being at least partially describable according to a 2D channel state of said impaired data channel, wherein transmitted wireless waveforms produce channel-convoluted waveforms at said at least one wireless receiver.

The method 2000 includes using at least one transmitter processor to package (2002) said data into at least one N×M 2D array of data symbols, and using an encoding process (2004) to transmit said array of data symbols so that every data symbol is spread over a time and frequency range of wireless signals configured to detect a 2D channel state of said impaired data channel. The method 2000 includes, on the receive side, using at least one receiver processor to receive said wireless signals (2006), using said 2D channel state to correct said signals for said data channel impairments (2008), and using an inverse of said encoding process to decode and extract said plurality of data symbols (2010).

Figure 21:
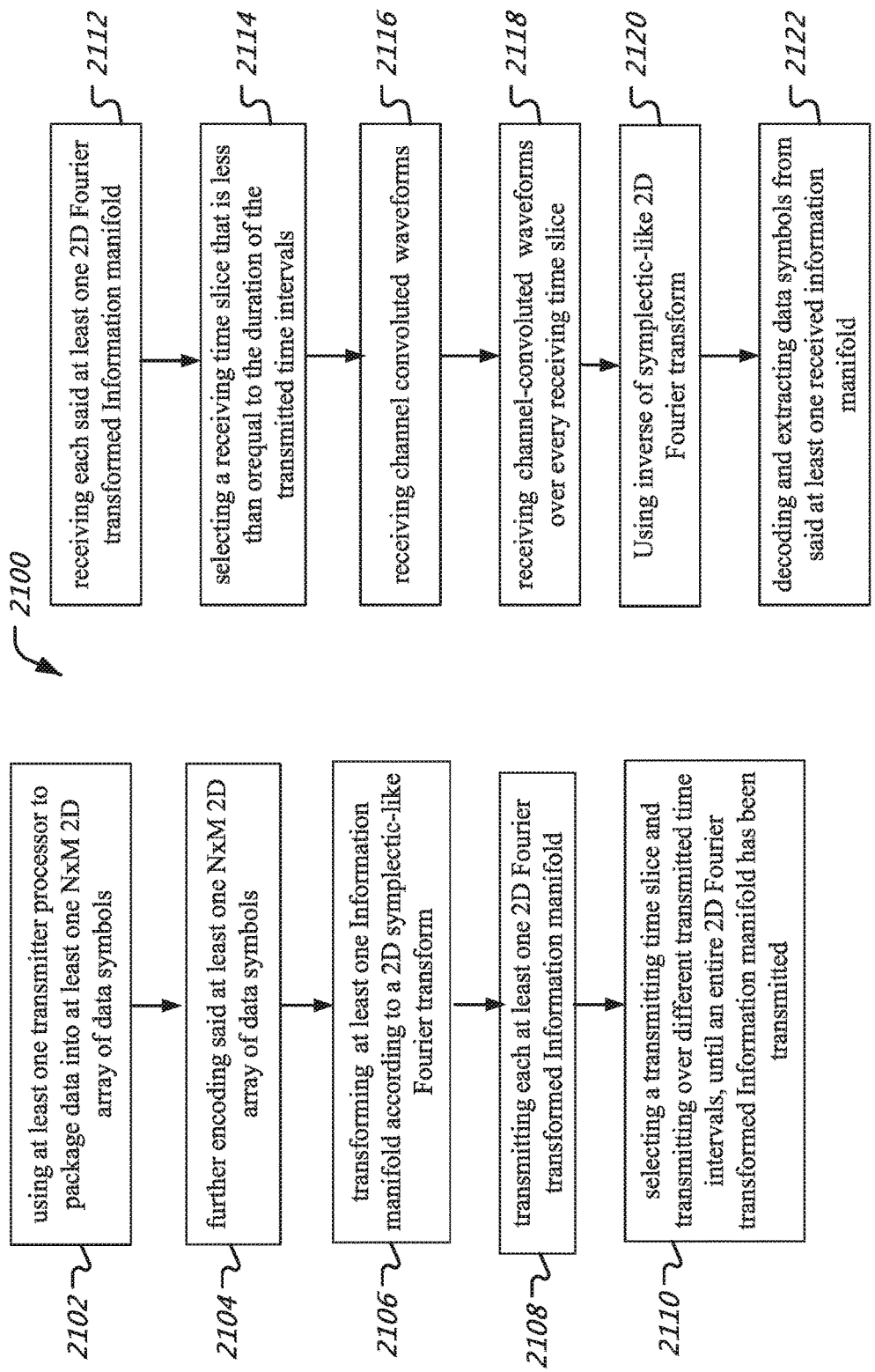
FIG. 21 is a flowchart depiction of another example of a wireless communication method.

FIG. 21 shows a flowchart for a method 2100 of wirelessly transmitting and receiving data over an impaired data channel connecting at least one wireless transmitter and at least one wireless receiver, said data comprising a plurality of data symbols.

The method 2100 includes using at least one transmitter processor to package (2102) said data into at least one N×M 2D array of data symbols, and further encoding (2104) said at least one N×M 2D array of data symbols onto at least one symplectic analysis compatible manifold distributed over a column time axis of length T and row frequency axis of length F, thereby producing at least one Information manifold.

The method 2100 includes using at least one transmitter processor to transform (2106) said at least one Information manifold according to a 2D symplectic-like Fourier transform, thereby producing at least one 2D Fourier transformed Information manifold.

The method 2100 includes transmitting (2108) each at least one 2D Fourier transformed Information manifold by overall frequencies and times of said 2D Fourier transformed Information manifold, selecting (2110) a transmitting time slice of duration proportional to $T\mu$, where $\mu=1/N$, and passing those frequencies in said 2D Fourier transformed Information manifold corresponding to said transmitting time slice through a bank of at least M different, non-overlapping, narrow-band frequency filters, and transmitting resulting filtered waveforms as a plurality of at least M simultaneously transmitted mutually orthogonal waveforms, over different transmitted time intervals, until an entire 2D Fourier transformed Information manifold has been transmitted. The impaired data channel impairs said waveforms, said impairment being at least partially describable according to a 2D channel state of said channel, thereby producing channel-convoluted waveforms at said at least one wireless receiver.

The method 2100 includes, at receiver side, receiving (2112) each said at least one 2D Fourier transformed Information manifold by over at least all frequencies and times of said 2D Fourier transformed Information manifold, using at least one receiver processor to select a receiving time slice (2114) that is less than or equal to the duration of the transmitted time intervals, and receiving (2116) these channel convoluted waveforms on each said receiving time slice through a receiving bank of at least M different, non-overlapping, narrow-band frequency filters, and receiving said channel-convoluted waveforms over every receiving time slice (2118) until an approximation of said 2D Fourier transformed Information manifold has been received.

The method 2100 includes performing (2120) at least one of (a) using an inverse of said 2D symplectic-like Fourier transform to transform said approximation of said 2D Fourier transformed Information manifold into an approximation of said at least one received information manifold, and using information pertaining to said 2D channel state to correct said at least one received information manifold for said data channel impairments, or (b) using information pertaining to said 2D channel state to correct said approximation of said 2D Fourier transformed Information manifold for said data channel impairments, and using the inverse of said 2D symplectic-like Fourier transform to in turn produce said at least one received information manifold.

The method 2100 further includes using said at least one receiver processor to decode and extract (2122) said data symbols from said at least one received information manifold.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An automated method of wirelessly transmitting and receiving data over an impaired data channel coupling at least one wireless transmitter and at least one wireless receiver, said data comprising a plurality of data symbols;
wherein said impaired data channel impairs said waveforms, said impairment being at least partially describable according to a 2D channel state of said impaired data channel, wherein transmitted wireless waveforms produce channel-convoluted waveforms at said at least one wireless receiver, said method comprising:
using at least one transmitter processor to package said data into at least one N×M 2D array of data symbols, and using an encoding process to transmit said array of data symbols so that every data symbol is spread over a time and frequency range of wireless signals configured to detect a 2D channel state of said impaired data channel; and
using at least one receiver processor to receive said wireless signals, using said 2D channel state to correct said signals for said data channel impairments, and using an inverse of said encoding process to decode and extract said plurality of data symbols;
wherein said encoding process encodes said at least one N×M 2D array of data symbols onto at least one symplectic-like analysis compatible manifold distributed over a column time axis of length T and row frequency axis of length F, thereby producing at least one Information manifold;

using at least one transmitter processor to transform said at least one Information manifold according to a 2D symplectic-like Fourier transform, thereby producing at least one 2D Fourier transformed Information manifold;

transmitting each at least one 2D Fourier transformed Information manifold by: over all frequencies and times of said 2D Fourier transformed Information manifold, selecting a transmitting time slice of duration proportional to Tμ, where μ=1/N, and passing those frequencies in said 2D Fourier transformed Information manifold corresponding to said transmitting time slice through a bank of at least M different, non-overlapping, narrow-band frequency filters, and transmitting resulting filtered waveforms as a plurality of at least M simultaneously transmitted mutually orthogonal waveforms, over different transmitted time intervals, until an entire 2D Fourier transformed Information manifold has been transmitted.

2. The method of claim 1, wherein said at least one receiver receives each said at least one 2D Fourier transformed Information manifold by:

over at least all frequencies and times of said 2D Fourier transformed Information manifold, using at least one receiver processor to select a receiving time slice that is less than or equal to the duration of the transmitted time intervals, and receiving these channel convoluted waveforms on each said receiving time slice through a receiving bank of at least M different, non-overlapping, narrow-band frequency filters, and receiving said channel-convoluted waveforms over every receiving time slice until an approximation of said 2D Fourier transformed Information manifold has been received;

performing at least one of:

a) using an inverse of said 2D symplectic-like Fourier transform to transform said approximation of said 2D Fourier transformed Information manifold into an approximation of said at least one received information manifold, and using information pertaining to said 2D channel state to correct said at least one received information manifold for said data channel impairments;

b) using information pertaining to said 2D channel state to correct said approximation of said 2D Fourier transformed Information manifold for said data channel impairments, and using the inverse of said 2D symplectic-like Fourier transform to in turn produce said at least one received information manifold.

3. An automated method of wirelessly transmitting and receiving data over an impaired data channel connecting at least one wireless transmitter and at least one wireless receiver, said data comprising a plurality of data symbols, said method comprising:

using at least one transmitter processor to package said data into at least one N×M 2D array of data symbols, and further encoding said at least one N×M 2D array of data symbols onto at least one symplectic analysis compatible manifold distributed over a column time axis of length T and row frequency axis of length F, thereby producing at least one Information manifold;

using at least one transmitter processor to transform said at least one Information manifold according to a 2D symplectic-like Fourier transform, thereby producing at least one 2D Fourier transformed Information manifold;

transmitting each at least one 2D Fourier transformed Information manifold by: over all frequencies and times of said 2D Fourier transformed Information manifold, selecting a transmitting time slice of duration proportional to Tμ, where μ=1/N, and passing those frequencies in said 2D Fourier transformed Information manifold corresponding to said transmitting time slice through a bank of at least M different, non-overlapping, narrow-band frequency filters, and transmitting resulting filtered waveforms as a plurality of at least M simultaneously transmitted mutually orthogonal waveforms, over different transmitted time intervals, until an entire 2D Fourier transformed Information manifold has been transmitted:

wherein said impaired data channel impairs said waveforms, said impairment being at least partially describable according to a 2D channel state of said channel, thereby producing channel-convoluted waveforms at said at least one wireless receiver;

receiving each said at least one 2D Fourier transformed Information manifold by:

over at least all frequencies and times of said 2D Fourier transformed Information manifold, using at least one receiver processor to select a receiving time slice that is less than or equal to the duration of the transmitted time intervals, and receiving these channel convoluted waveforms on each said receiving time slice through a receiving bank of at least M different, non-overlapping, narrow-band frequency filters, and receiving said channel-convoluted waveforms over every receiving time slice until an approximation of said 2D Fourier transformed Information manifold has been received;

performing at least one of:

a) using an inverse of said 2D symplectic-like Fourier transform to transform said approximation of said 2D Fourier transformed Information manifold into an approximation of said at least one received information manifold, and using information pertaining to said 2D channel state to correct said at least one received information manifold for said data channel impairments;

b) using information pertaining to said 2D channel state to correct said approximation of said 2D Fourier transformed Information manifold for said data channel impairments, and using the inverse of said 2D symplectic-like Fourier transform to in turn produce said at least one received information manifold; and using said at least one receiver processor to decode and extract said data symbols from said at least one received information manifold.

4. The method of claim 3, wherein said processor further transforms said at least one N×M 2D array of data according to a spreading operation either prior or after encoding said at least one N×M 2D array of data symbols onto at least one symplectic analysis compatible manifold, and wherein said receiving processor uses an inverse of said spreading operation to decode and extract said data symbols from said at least one received information manifold.

5. The method of claim 4, wherein said spreading operation is convolution with a 2D chirp operation.

6. The method of claim 3, wherein said non-overlapping, narrow-band frequency filters pass frequencies from said at least one 2D Fourier transformed Information manifold proportional to $g(t \cdot e^{jk\omega_0})$ where j is the square root of −1, t corresponds to a given time slice of duration µ chosen from said at least one 2D Fourier transformed Information manifold, and k corresponds to a given row position on said at least one 2D Fourier transformed Information manifold, where k varies between 1 and M.

7. The method of claim 3, wherein $\omega_0$ is proportional to 1/T, and T=M/(allowed wireless bandwidth).

8. The method of claim 3, wherein said at least one 2D Fourier transformed Information manifold has overall dimensions $NT_\mu$ according to a time axis and M/T according to a frequency axis, and each cell in said at least one 2D Fourier transformed Information manifold has overall dimensions proportional to $T_\mu$ according to a time axis and 1/T according to a frequency axis.

9. The method of claim 3, wherein said receiver receives said at least one 2D Fourier transformed Information manifold according to receiving time slices and receiving banks of different, non-overlapping, narrow-band frequency filters that oversamples the corresponding transmitting time slices and transmitting banks of different, non-overlapping, narrow-band frequency filters.

10. The method of claim 3, wherein said transmitter transmits said resulting filtered waveforms, until an entire 2D Fourier transformed Information manifold has been transmitted, as either:
1) a plurality of at least M simultaneously transmitted mutually orthogonal waveforms over either different consecutive transmitted time intervals; or
2) a plurality OTFS data or OTFS pilot bursts comprising at least M simultaneously transmitted mutually orthogonal waveform bursts over different transmitted intervals separated by at least one spacer time interval.

11. The method of claim 10, wherein said impaired data channel is an impaired wireless data channel comprising at least one wireless reflector, each said at least one reflector comprising a reflector location, reflector velocity, reflector frequency shift comprising a reflector velocity caused Doppler shift, and at least one reflector coefficients of wireless reflection;
each said at least one wireless transmitter comprising a transmitter location, transmitter velocity, transmitter frequency and transmitter frequency shift, said transmitter frequency shift causing a change in said transmitter frequency according to a transmitter velocity caused Doppler shift;
each said at least one wireless receiver comprising a receiver location, receiver velocity, receiver frequency and receiver frequency shift, said receiver frequency shift causing a change in said receiver frequency according to a receiver velocity caused Doppler shift;
wherein said 2D channel state comprises information pertaining to relative locations, velocities, velocity induced frequency shifts caused by transmitter Doppler shifts, receiver Doppler shifts, reflector Doppler shifts, and reflector coefficients of reflection of said at least one transmitters, receivers, and reflectors;
said method comprising:
using said at least one transmitter and at least one processor to transmit direct OTFS data waveforms or waveform bursts, said direct OTFS data waveforms or waveform bursts comprising a plurality of OTFS data symbols $D_{pt,pf}$ transmitted as OTFS data symbol waveform or waveform bursts $D_{pt,pf} \cdot W_p(pt, pf)$, over a plurality of combinations of times pt and frequencies pf, where each said pt and pf are unique data time-frequency coordinates chosen from a two dimensional data OTFS time-frequency grid;
said receiver configured to receive at least said data waveforms or waveform bursts according to at least a two dimensional data OTFS time-frequency bin structure with bin sizes and bin-coordinate positions proportional to a sample or oversample of said OTFS time-frequency grid;
wherein upon propagation through said impaired data channel, said direct OTFS data waveforms or waveform bursts then travel over at least one path, said at least one path comprising at least one of:
a: direct OTFS data waveforms or waveform bursts traveling directly from said at least one transmitter to said at least one receiver; and
b: replica OTFS data waveforms or waveform bursts comprising direct OTFS data waveforms or waveform bursts that have reflected off of said at least one reflector before reaching said at least one receiver, thereby producing direct OTFS waveforms or waveform bursts that are further reflector time-delayed and reflector frequency-shifted at said at least one receiver;
wherein at said at least one receiver, a resulting combination of any said transmitter frequency shifted and receiver frequency shifted direct OTFS data waveforms or waveform bursts and any said replica OTFS data waveforms or waveform bursts produces channel-convoluted OTFS data waveforms or waveform bursts;
at said at least one receiver, using said bin structure to receive said channel-convoluted OTFS data waveforms or waveform bursts
using said 2D channel state and at least one processor to further perform at least one of:
a) determine said 2D channel state of said impaired data channel connecting said at least one transmitter and said at least one receiver;
b) precoding at least some of said direct data waveforms or waveform bursts at said at least one wireless transmitter to pre-compensate for said impaired data channel; and deconvoluting at least some of said channel-convoluted data waveforms or waveform bursts at said at least one wireless receiver, thereby deriving at least an approximation of said plurality of data symbols.

12. The method of claim 11, wherein $D_{pt,pf}$ corresponds to a contents of bin coordinate (pt, pf) from said at least one 2D Fourier transformed Information manifold, and Wp(pt, pf) corresponds $g(t \cdot e^{jk\omega_0})$ where k=pf.

13. The method of claim 3, wherein said 2D channel state information is determined by transmitting and receiving at least one pilot symbol.

14. A wireless communication apparatus, comprising:
a memory that stores instructions;
a processor;
and a radio frequency (RF) transmitter;
wherein the processor reads instructions from the memory and implements an automated method of wirelessly transmitting data over an impaired data channel, communicatively connecting the RF transmitter and at least one wireless receiver, said data comprising a plurality of data symbols, the instructions comprising:
instructions for packaging said data into at least one N×M 2D array of data symbols, and further encoding said at least one N×M 2D array of data symbols onto at least one symplectic analysis compatible manifold distributed over a column time axis of length T and row frequency axis of length F, thereby producing at least one Information manifold;
instructions for transforming said at least one Information manifold according to a 2D symplectic-like Fourier transform, thereby producing at least one 2D Fourier transformed Information manifold;

instructions for causing the RF transmitter to transmit each at least one 2D Fourier transformed Information manifold by: over all frequencies and times of said 2D Fourier transformed Information manifold, instructions for selecting a transmitting time slice of duration proportional to $T\mu$, where $\mu=1/N$, and passing those frequencies in said 2D Fourier transformed Information manifold corresponding to said transmitting time slice through a bank of at least M different, non-overlapping, narrow-band frequency filters, and transmitting resulting filtered waveforms as a plurality of at least M simultaneously transmitted mutually orthogonal waveforms, over different transmitted time intervals, until an entire 2D Fourier transformed Information manifold has been transmitted;

wherein said impaired data channel impairs said waveforms, said impairment being at least partially describable according to a 2D channel state of said channel, thereby producing channel-convoluted waveforms at said at least one wireless receiver.

15. The apparatus of claim 14, wherein said processor further transforms said at least one N×M 2D array of data according to a spreading operation either prior or after encoding said at least one N×M 2D array of data symbols onto at least one symplectic analysis compatible manifold, and wherein said receiving processor uses an inverse of said spreading operation to decode and extract said data symbols from said at least one received information manifold.

16. The apparatus of claim 15, wherein said spreading operation is convolution with a 2D chirp operation.

17. The apparatus of claim 14, wherein said non-overlapping, narrow-band frequency filters pass frequencies from said at least one 2D Fourier transformed Information manifold proportional to $g(t \cdot e^{jk\omega_0})$ where j is the square root of −1, t corresponds to a given time slice of duration $\mu$ chosen from said at least one 2D Fourier transformed Information manifold, and k corresponds to a given row position on said at least one 2D Fourier transformed Information manifold, where k varies between 1 and M.

18. The apparatus of claim 14, wherein $\omega_0$ is proportional to 1/T, and T=M/(allowed wireless bandwidth).

* * * * *